United States Patent
Park et al.

(10) Patent No.: US 11,336,354 B2
(45) Date of Patent: May 17, 2022

(54) CHANNEL STATE INFORMATION REPORTING METHOD IN WIRELESS COMMUNICATION SYSTEM AND DEVICE THEREFOR

(71) Applicant: LG ELECTRONICS INC., Seoul (KR)

(72) Inventors: Haewook Park, Seoul (KR); Jiwon Kang, Seoul (KR); Kijun Kim, Seoul (KR); Hyunsoo Ko, Seoul (KR); Hyungtae Kim, Seoul (KR); Kunil Yum, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1 day.

(21) Appl. No.: 16/622,867

(22) PCT Filed: Jun. 14, 2018

(86) PCT No.: PCT/KR2018/006714
§ 371 (c)(1),
(2) Date: Dec. 13, 2019

(87) PCT Pub. No.: WO2018/230967
PCT Pub. Date: Dec. 20, 2018

(65) Prior Publication Data
US 2020/0412431 A1  Dec. 31, 2020

Related U.S. Application Data

(60) Provisional application No. 62/520,475, filed on Jun. 15, 2017, provisional application No. 62/543,944, (Continued)

(51) Int. Cl.
*H04B 7/06* (2006.01)
*H04L 1/00* (2006.01)
(Continued)

(52) U.S. Cl.
CPC ........ *H04B 7/0632* (2013.01); *H04B 7/0626* (2013.01); *H04L 1/0003* (2013.01);
(Continued)

(58) Field of Classification Search
None
See application file for complete search history.

(56) References Cited

U.S. PATENT DOCUMENTS

2012/0307754 A1* 12/2012 Shi .......................... H04L 5/003
370/329
2014/0301306 A1* 10/2014 Kim ....................... H04L 5/0057
370/329
(Continued)

FOREIGN PATENT DOCUMENTS

EP  2999262  3/2016
WO  2015141959  9/2015

OTHER PUBLICATIONS

PCT International Application No. PCT/KR2018/006714, International Search Report dated Sep. 13, 2018, 6 pages.

*Primary Examiner* — Ayanah S George
(74) *Attorney, Agent, or Firm* — Lee, Hong, Degerman, Kang & Waimey PC

(57) ABSTRACT

A CSI reporting method by a terminal in a wireless communication system can comprise the steps of: receiving, from a base station, CSI configuration information for CSI reporting; and reporting, to the base station, CSI generated on the basis of the CSI configuration information. If the CSI comprises CQI and defined is a CQI table in which different CQI indexes are allocated by different MCS levels for the CQI reporting, the CSI configuration information comprises a CQI index range reportable by the terminal in the CQI
(Continued)

table and/or CQI configuration information relating to the interval between the CQI indexes reportable by the terminal in the CQI index range.

12 Claims, 17 Drawing Sheets

Related U.S. Application Data filed on Aug. 10, 2017, provisional application No. 62/557,049, filed on Sep. 11, 2017.

(51) Int. Cl.
  *H04W 24/10* (2009.01)
  *H04W 72/08* (2009.01)
  *H04W 88/02* (2009.01)

(52) U.S. Cl.
  CPC ......... *H04W 24/10* (2013.01); *H04W 72/085* (2013.01); *H04W 88/02* (2013.01)

(56) References Cited

U.S. PATENT DOCUMENTS

| | | |
|---|---|---|
| 2015/0200746 A1 | 7/2015 | Pan et al. |
| 2016/0211904 A1 | 7/2016 | Kim et al. |
| 2017/0207878 A1* | 7/2017 | Chen .................... H04L 1/0025 |

* cited by examiner

[Figure 1]
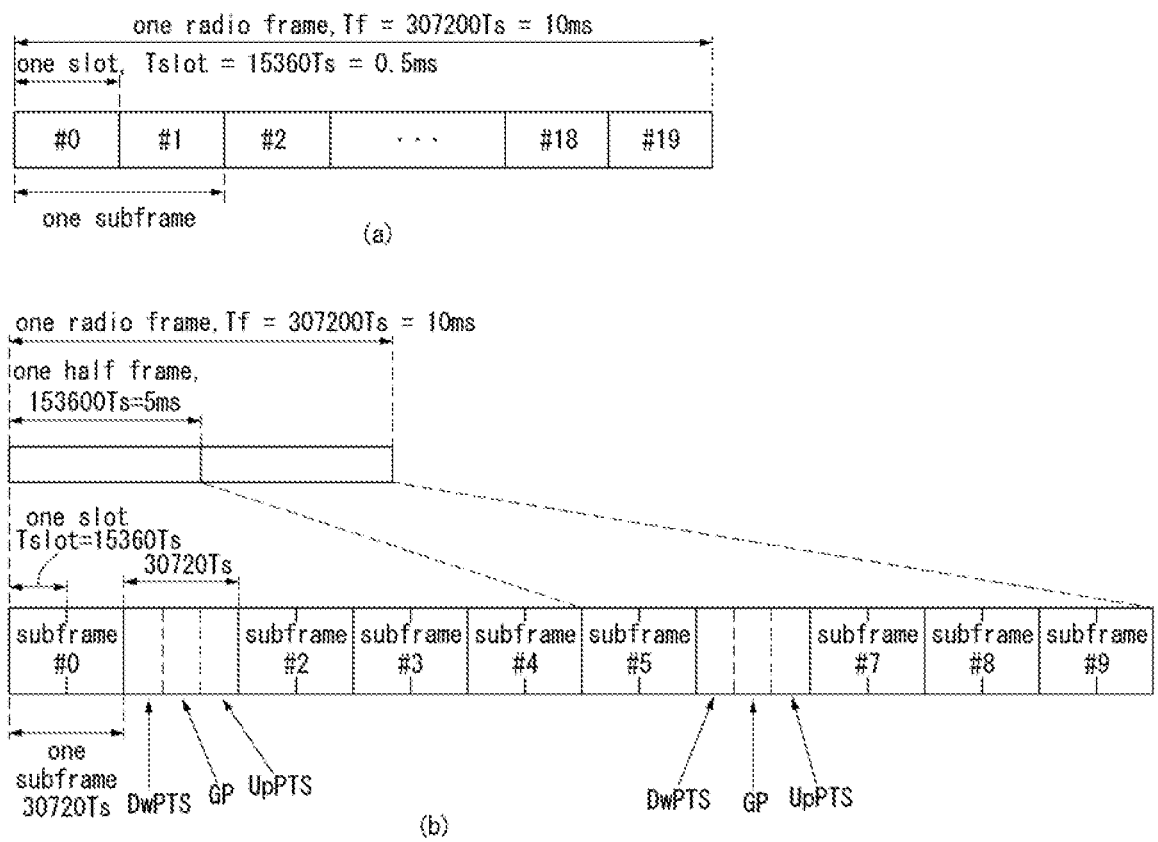

[Figure 2]
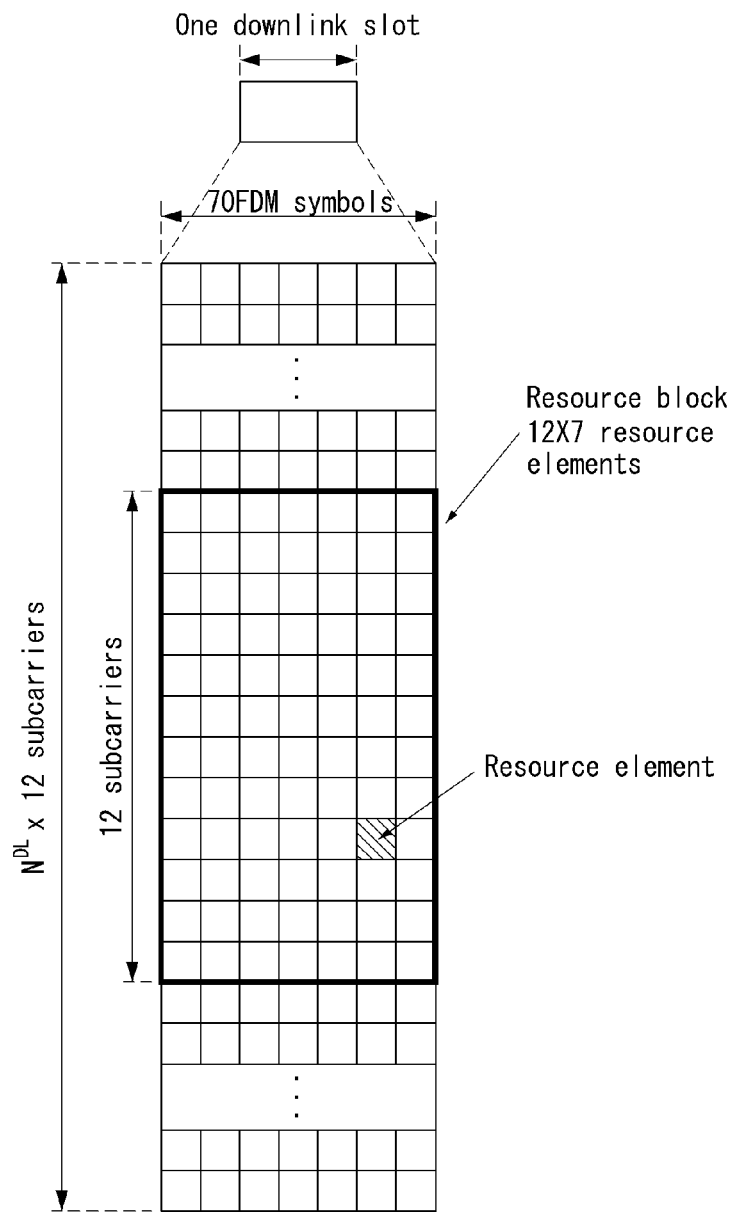

【Figure 3】
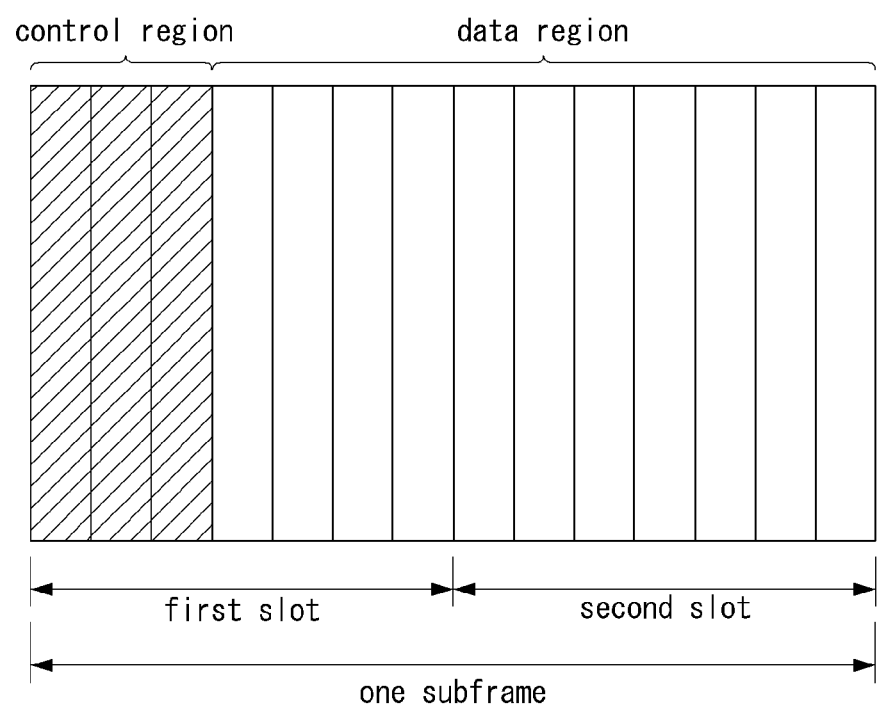
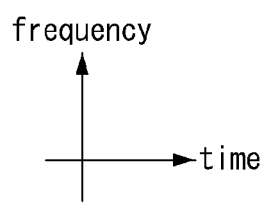

[Figure 4]
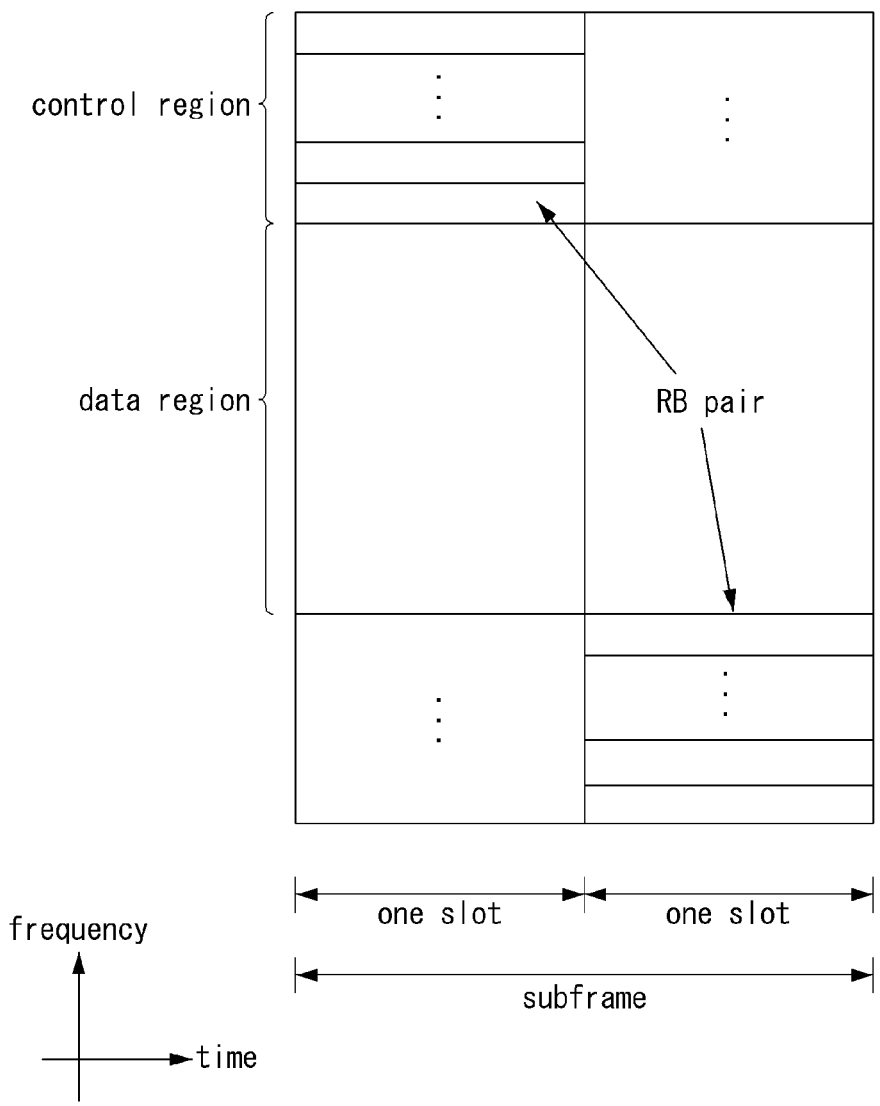

[Figure 5]
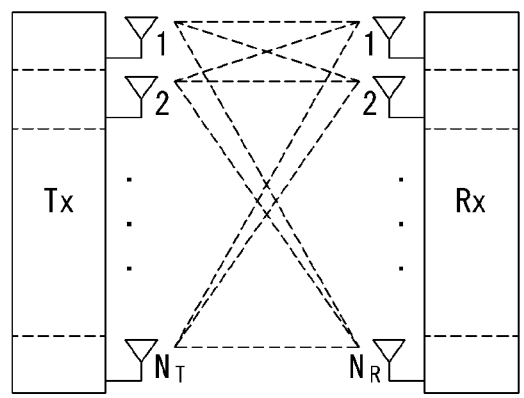
[Figure 6]
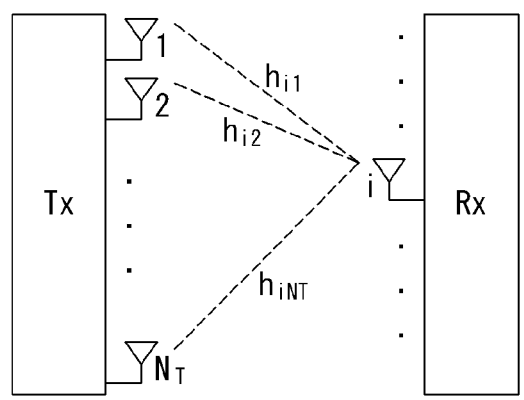

[Figure 7]
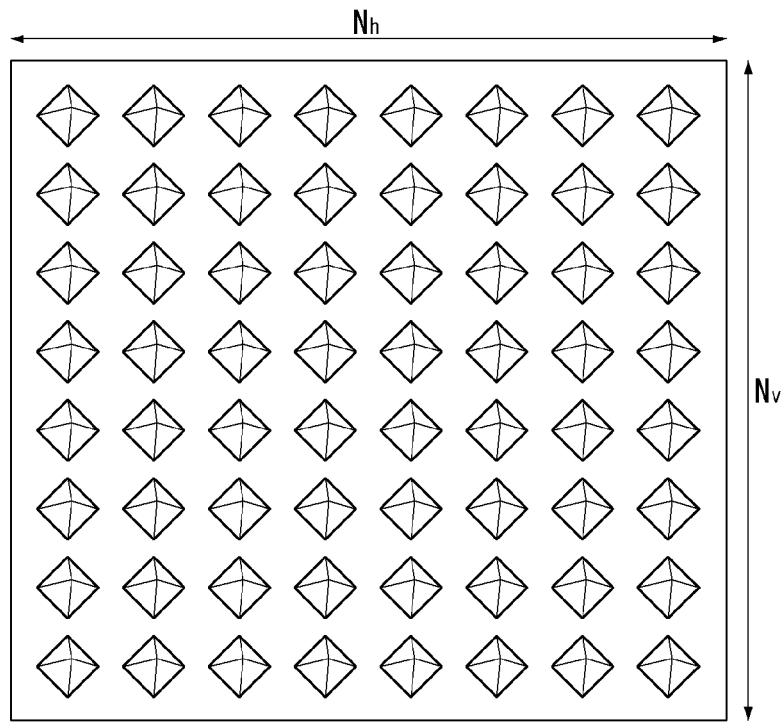
[Figure 8]
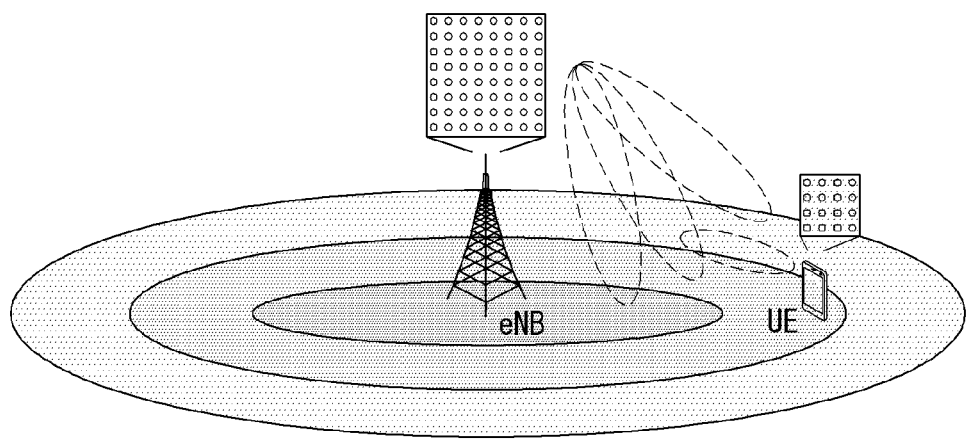

[Figure 9]
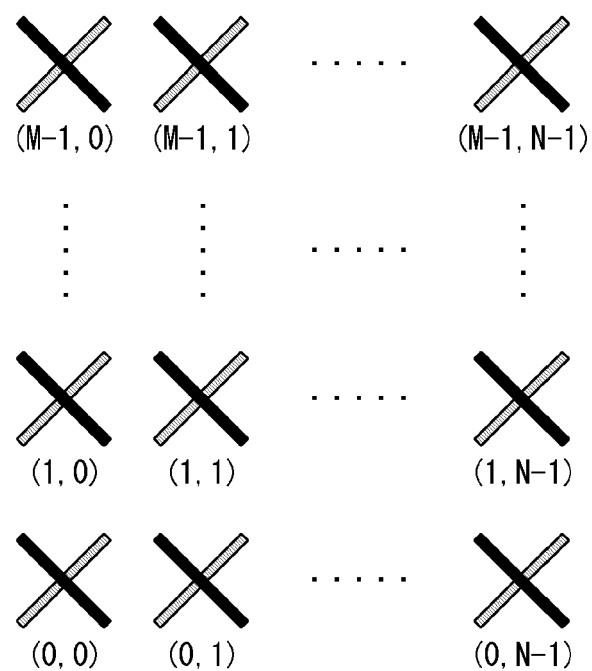

[Figure 10]
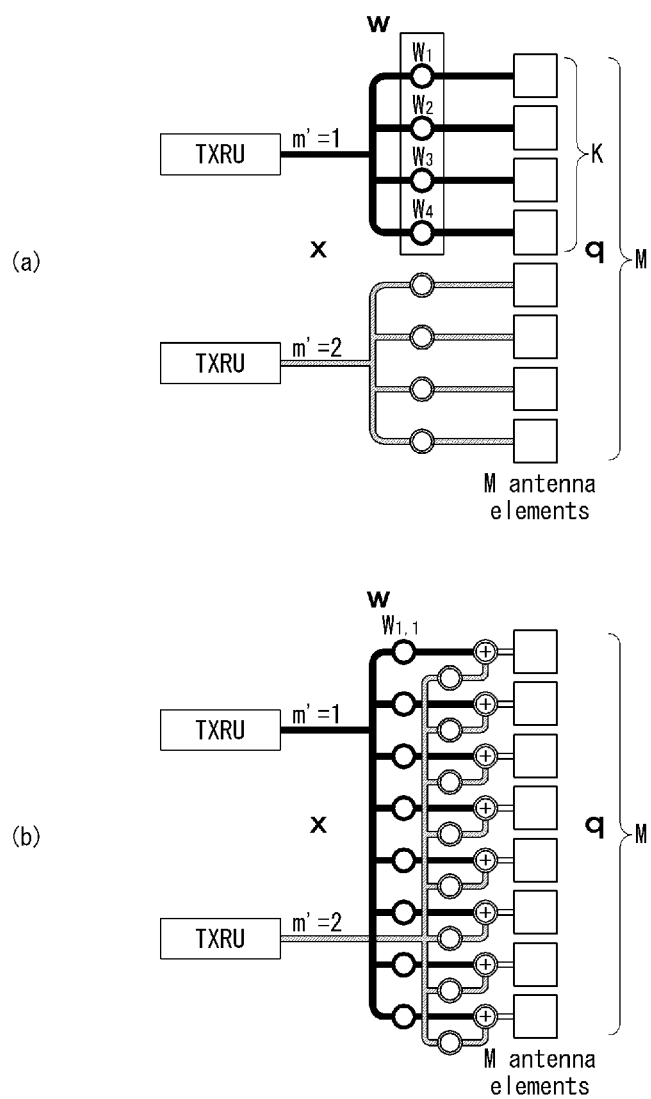

[Figure 11]
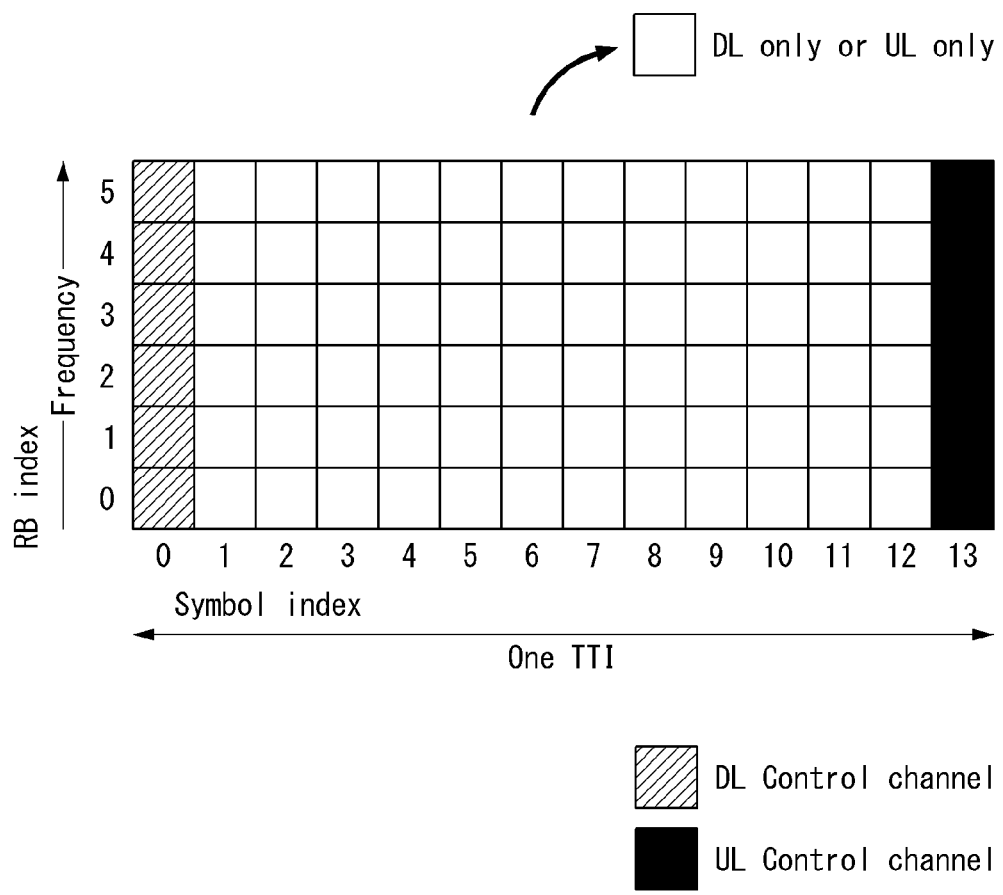

[Figure 12]
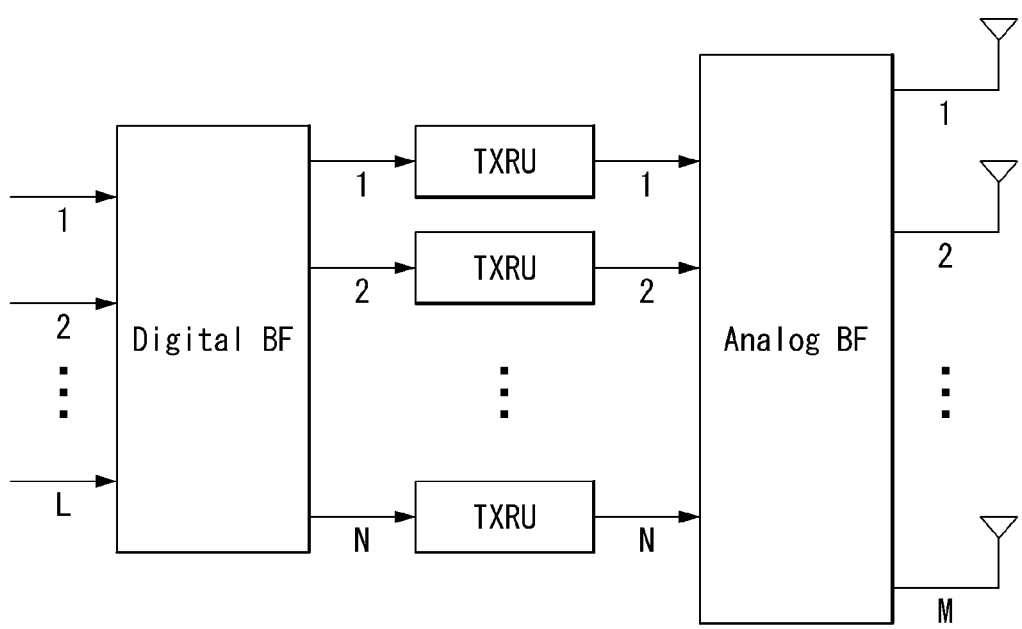

[Figure 13]
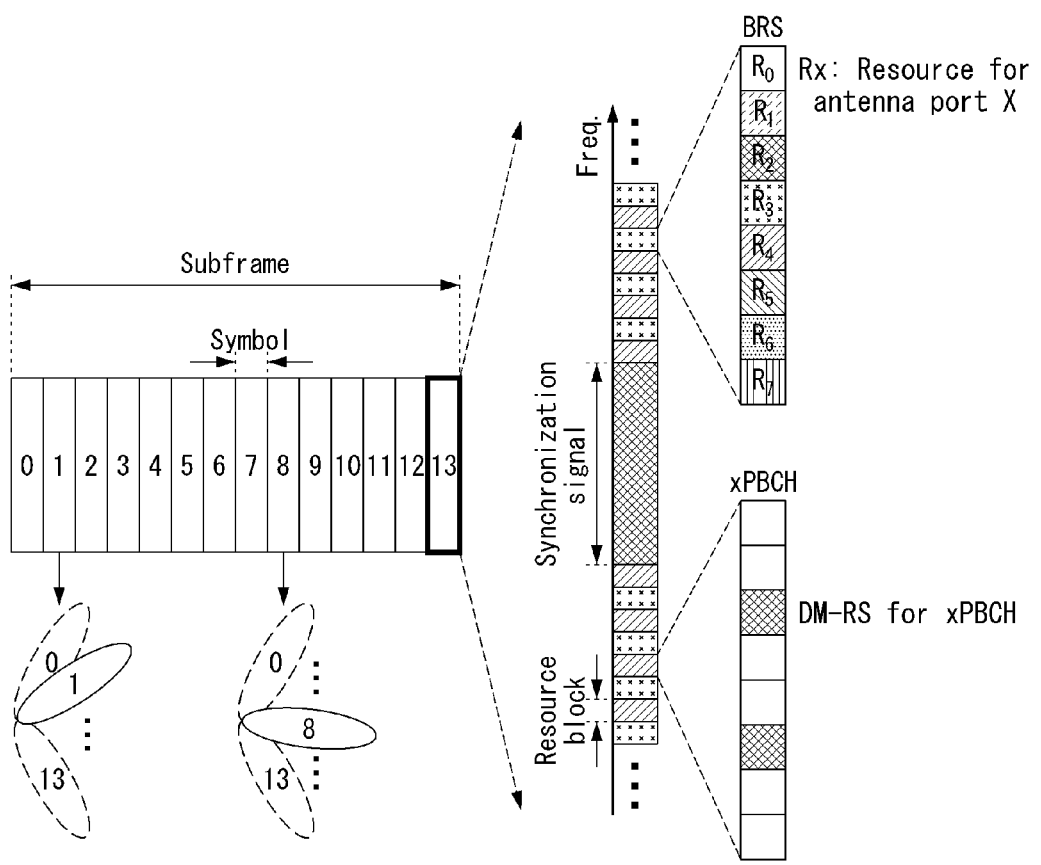

【Figure 14】
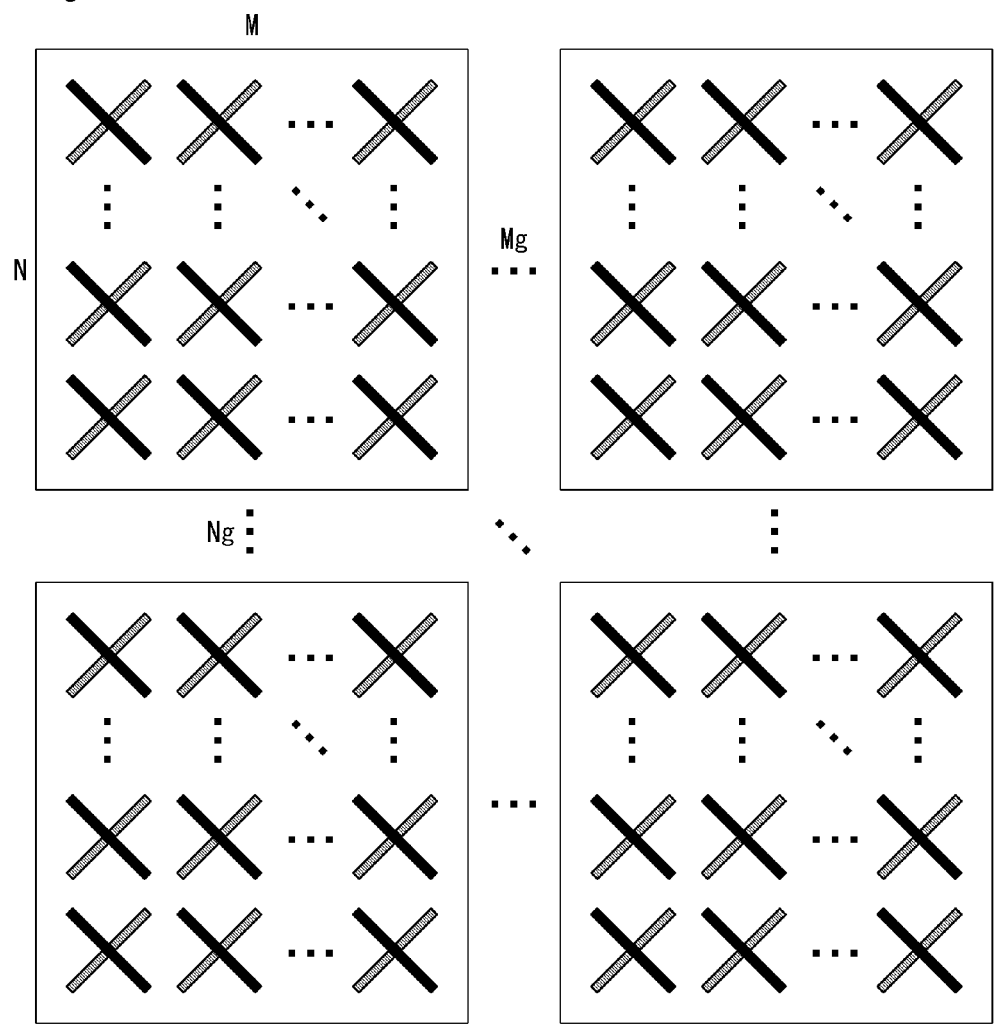

【Figure 15】

[Figure 16]
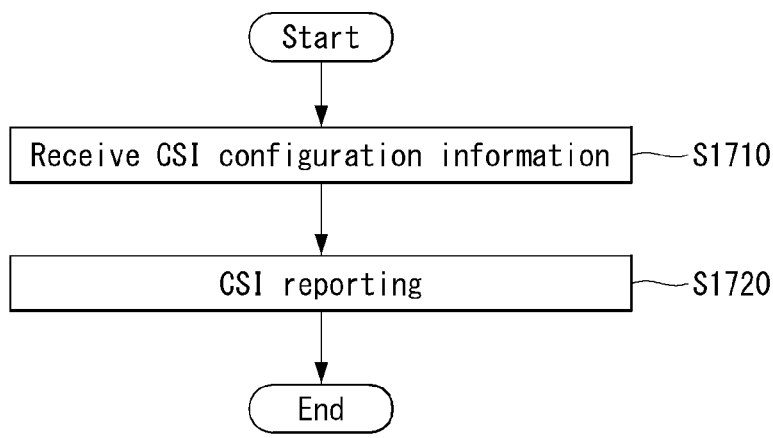
[Figure 17]
```
        Start
          ↓
Receive CSI configuration information —S1710
          ↓
       CSI reporting —S1720
          ↓
         End
```

【Figure 18】
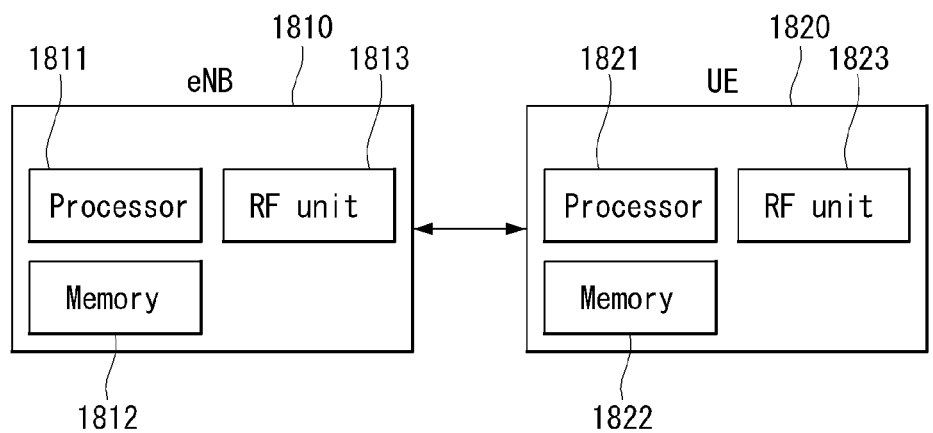

[Figure 19]
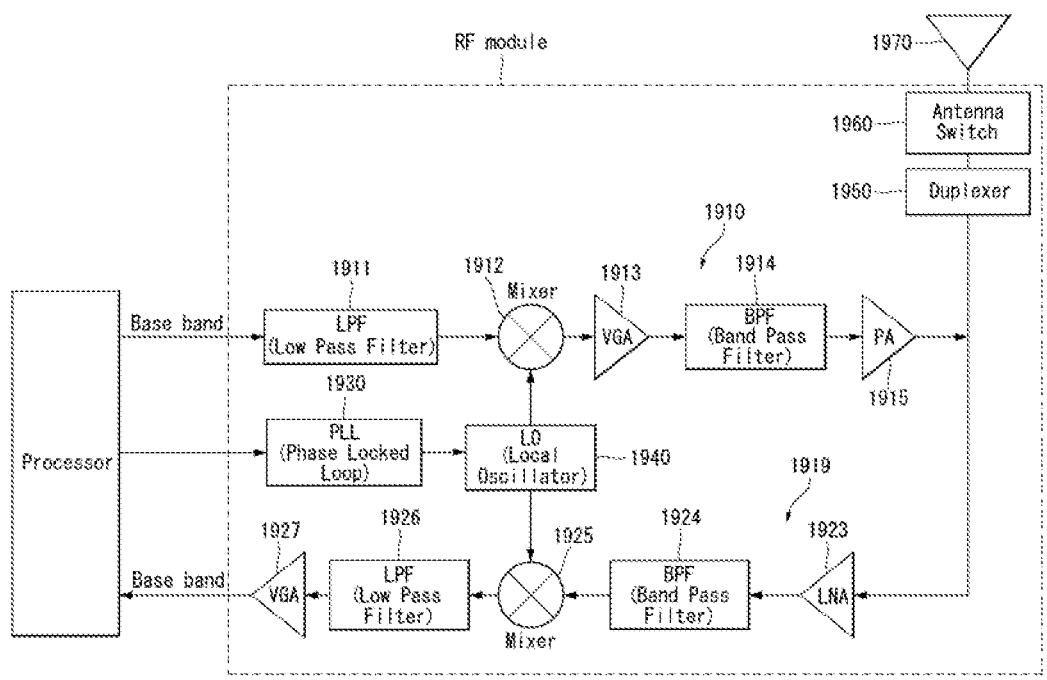

[Figure 20]
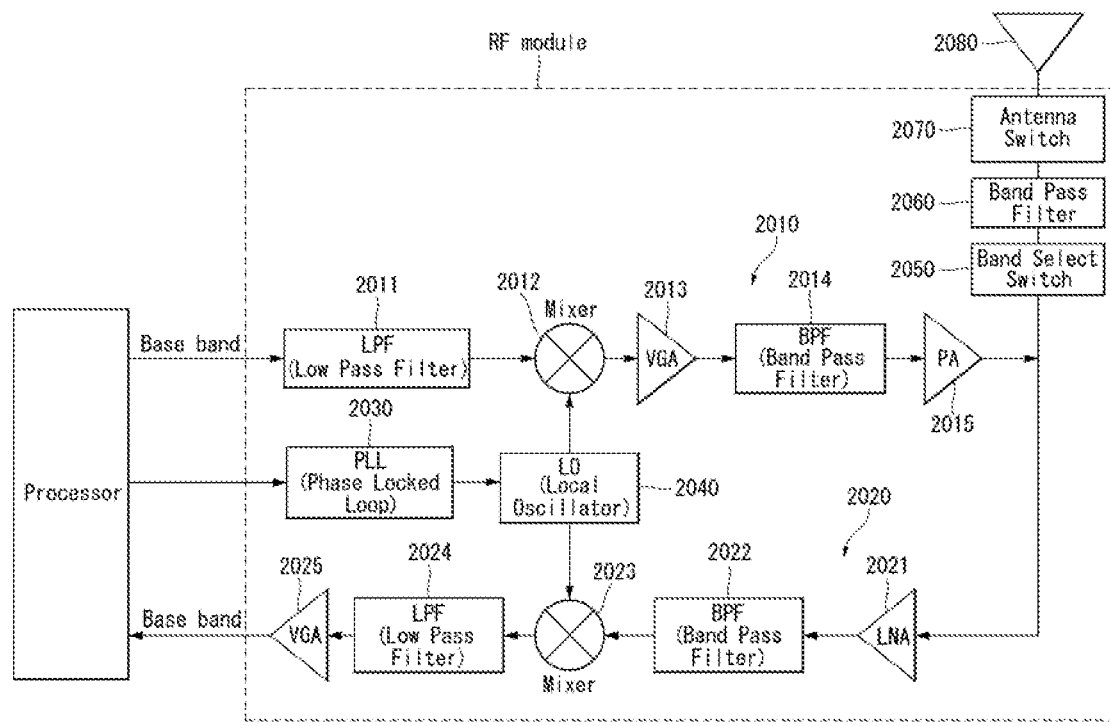

CHANNEL STATE INFORMATION REPORTING METHOD IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2018/006714, filed on Jun. 14, 2018, which claims the benefit of U.S. Provisional Application No. 62/520,475, filed on Jun. 15, 2017, 62/543,944, filed on Aug. 10, 2017, and 62/557,049, filed on Sep. 11, 2017, the contents of which are all hereby incorporated by reference herein in their entirety.

TECHNICAL FIELD

The present disclosure relates to a wireless communication system and more particularly, to a method for reporting channel state information by a terminal and a device performing/supporting the method.

BACKGROUND ART

A mobile communication system has been developed to provide a voice service while ensuring an activity of a user. However, in the mobile communication system, not only a voice but also a data service is extended. At present, due to an explosive increase in traffic, there is a shortage of resources and users demand a higher speed service, and as a result, a more developed mobile communication system is required.

Requirements of a next-generation mobile communication system should be able to support acceptance of explosive data traffic, a dramatic increase in per-user data rate, acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

A technical object of the present disclosure is to propose a method for reporting channel state information of a terminal. In particular, a technical object of the present disclosure is to propose various embodiments of specific CSI content reported to a base station by a terminal.

Technical objects to be achieved by the present disclosure are not limited to those described above, and other technical objects not mentioned above may also be clearly understood from the descriptions given below by those skilled in the art to which the present disclosure belongs.

Technical Solution

According to one aspect of the present disclosure, a channel state information (CSI) reporting method by a terminal in a wireless communication system may comprise receiving, from a base station, CSI configuration information for CSI reporting; and reporting, to the base station, CSI generated based on the CSI configuration information. If the CSI comprises Channel Quality Indicator (CQI) and a CQI table in which different CQI indexes are allocated by different Modulation Coding Scheme (MCS) levels for the CQI reporting is defined, the CSI configuration information comprises a CQI index range reportable by the terminal within the CQI table and/or CQI configuration information about an interval between the CQI indexes reportable by the terminal within the CQI index range.

Also, CSI transmitted to the base station may include at least one CQI index selected among CQI indexes indicated by the CQI configuration information.

Also, the CQI configuration information may include a minimum CQI index and/or a maximum CQI index within the CQI index range as the CQI index range information.

Also, the CQI indexes reportable by the terminal may be determined by the minimum CQI index and CQI indexes separated by the index interval from the minimum CQI index up to the maximum CQI index within the CQI index range; or by the maximum CQI index and CQI indexes separated by the index interval from the maximum CQI index down to the minimum CQI index within the CQI index range.

Also, a bit size of the CQI table comprising CQI indexes reportable by the terminal may be configured independently for each terminal.

Also, a bit size (Q) of the CQI table comprising CQI indexes reportable by the terminal may be determined by Eq. 1.

$$Q = \text{ceiling}[\log\_2((CQI\_max - CQI\_min)/CQI\_stepsize) + 1]. \quad [\text{Eq. 1}]$$

Here, the CQI_max may represent the maximum CQI index, the CQI_min may represent the minimum CQI index, and the stepsize may represent the index interval.

Also, the different MCS levels may indicate different modulation methods and/or coding rates.

Also, the index interval may be configured differently for each of the modulation methods.

Also, the CQI configuration information may be transmitted to the terminal through Radio Resource Control (RRC) and/or Media Access Control (MAC) Control Element (CE).

Also, if the CSI report corresponds to a Physical Uplink Control Channel (PUCCH)-based CSI report, the total bit size and/or format of the CSI may be determined based on the number of ports configured for the terminal, panel type and/or RI to be reported by the terminal as the CSI.

Also, the CQI table may correspond to a legacy CQI table defined in a legacy system or a CQI table defined separately from the legacy CQI table.

Also, the separately defined CQI table may be a table defined to have relatively higher resolution than the legacy CQI table.

Also, according to another aspect of the present disclosure, a terminal reporting Channel State Information (CSI) in a wireless communication system may comprise a Radio Frequency (RF) unit for transmitting and receiving a radio signal; and a processor for controlling the RF unit, wherein the processor is configured to receive, from a base station, CSI configuration information for CSI reporting; and to report, to the base station, CSI generated based on the CSI configuration information. If the CSI comprises Channel Quality Indicator (CQI) and a CQI table in which different CQI indexes are allocated by different Modulation Coding Scheme (MCS) levels for the CQI reporting is defined, the CSI configuration information comprises a CQI index range reportable by the terminal within the CQI table and/or CQI configuration information about an interval between the CQI indexes reportable by the terminal within the CQI index range.

Also, CSI transmitted to the base station may include at least one CQI index selected among CQI indexes indicated by the CQI configuration information.

Also, the CQI configuration information may include a minimum CQI index and/or a maximum CQI index within the CQI index range as the CQI index range information.

Also, the CQI indexes reportable by the terminal may be determined by the minimum CQI index and CQI indexes separated by the index interval from the minimum CQI index up to the maximum CQI index within the CQI index range; or by the maximum CQI index and CQI indexes separated by the index interval from the maximum CQI index down to the minimum CQI index within the CQI index range.

Advantageous Effects

The present disclosure has an advantage in that it can increase the amount of network data by sending or receiving data using a licensed spectrum and an unlicensed spectrum through an LTE-WLAN aggregation.

Furthermore, the present disclosure has an advantage in that it can reduce the power consumption of a terminal by activating a Wi-Fi module only when data is generated in order to send/receive data and deactivating the Wi-Fi module if the transmission/reception of data is not present.

Furthermore, the present disclosure has an advantage in that it can send/receive data depending on the state of a terminal in such manner that an AP managing the terminal wakes up the Wi-Fi module of the terminal

DESCRIPTION OF DRAWINGS

The accompanying drawings, which are included herein as a part of detailed descriptions to help understanding the present disclosure, provide embodiments of the present disclosure and describe technical features of the present disclosure with detailed descriptions below.

FIG. 1 illustrates a structure of a radio frame in a wireless communication system to which the present disclosure may be applied.

FIG. 2 illustrates resource grids for one downlink slot in a wireless communication system to which the present disclosure may be applied.

FIG. 3 illustrates a structure of a downlink subframe in a wireless communication system to which the present disclosure may be applied.

FIG. 4 illustrates a structure of an uplink subframe in a wireless communication system to which the present disclosure may be applied.

FIG. 5 illustrates a structure of a general MIMO communication system.

FIG. 6 illustrates a channel from a plurality of transmission antennas to one reception antenna.

FIG. 7 illustrates a 2D active antenna system having 64 antenna elements in a wireless communication system to which the present disclosure may be applied.

FIG. 8 illustrates a system having a plurality of transmission/reception antennas by which a base station or a terminal may perform AAS-based three-dimensional (3D) beam forming in a wireless communication system to which the present disclosure may be applied.

FIG. 9 illustrates a 2D antenna system showing cross polarization in a wireless communication system to which the present disclosure may be applied.

FIG. 10 illustrates a transceiver unit model in a wireless communication system to which the present disclosure may be applied.

FIG. 11 illustrates a self-contained subframe structure to which the present disclosure may be applied.

FIG. 12 illustrates a hybrid beamforming structure from a perspective of a TXRU and a physical antenna.

FIG. 13 illustrates a beam sweeping operation for a synchronization signal and system information in a DL transmission process.

FIG. 14 illustrates a panel antenna array to which the present disclosure may be applied.

FIGS. 15(*a*) and 15(*b*) illustrate an NR DL type I single panel codebook payload size according to one embodiment of the present disclosure.

FIGS. 16(*a*) and 16(*b*) illustrate an NR DL type I multi-panel codebook payload size according to one embodiment of the present disclosure.

FIG. 17 is a flow diagram illustrating a CSI reporting method of a terminal according to one embodiment of the present disclosure.

FIG. 18 illustrates a block diagram of a wireless communication device according to one embodiment of the present disclosure.

FIG. 19 illustrates one example of an RF module of a wireless communication device to which a method proposed in the present specification may be applied.

FIG. 20 illustrates another example of an RF module of a wireless communication device to which a method proposed in the present specification may be applied.

MODE FOR INVENTION

Hereafter, preferred embodiments of the present disclosure will be described in detail with reference to the accompanying drawings. A detailed description to be disclosed hereinbelow together with the accompanying drawing is to describe embodiments of the present disclosure and not to describe a unique embodiment for carrying out the present disclosure. The detailed description below includes details in order to provide a complete understanding. However, those skilled in the art know that the present disclosure can be carried out without the details.

In some cases, in order to prevent a concept of the present disclosure from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present disclosure and the use of the specific terms may be modified into other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16(WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present disclosure may be based on standard documents disclosed in at least one of IEEE 802, 3GPP, and 3GPP2 which are the wireless access systems. That is, steps or parts which are not described to definitely show the technical spirit of the present disclosure among the embodiments of the present disclosure may be based on the documents. Further, all terms disclosed in the document may be described by the standard document.

3GPP LTE/LTE-A is primarily described for clear description, but technical features of the present disclosure are not limited thereto.

General Wireless Communication System to which an Embodiment of the Present Disclosure May be Applied FIG. 1 shows the structure of a radio frame in a wireless communication system to which an embodiment of the present disclosure may be applied.

3GPP LTE/LTE-A support a type 1 radio frame structure capable of being applied to frequency division duplex (FDD) and a type 2 radio frame structure capable of being applied to time division duplex (TDD).

In FIG. 1, the size of the radio frame in a time domain is expressed in a multiple of a time unit "T_s=1/(15000*2048)." Downlink and uplink transmission includes a radio frame having an interval of T_f=307200*T_s=10 ms.

FIG. 1(a) illustrates the type 1 radio frame structure. The type 1 radio frame may be applied to both full duplex FDD and half duplex FDD.

The radio frame includes 10 subframes. One radio frame includes 20 slots each having a length of T_slot=15360*T_s=0.5 ms. Indices 0 to 19 are assigned to the respective slots. One subframe includes two contiguous slots in the time domain, and a subframe i includes a slot 2i and a slot 2i+1. The time taken to send one subframe is called a transmission time interval (TTI). For example, the length of one subframe may be 1 ms, and the length of one slot may be 0.5 ms.

In FDD, uplink transmission and downlink transmission are classified in the frequency domain. There is no restriction to full duplex FDD, whereas a UE is unable to perform transmission and reception at the same time in a half duplex FDD operation.

One slot includes a plurality of orthogonal frequency division multiplexing (OFDM) symbols in the time domain and includes a plurality of resource blocks (RBs) in the frequency domain. An OFDM symbol is for expressing one symbol period because 3GPP LTE uses OFDMA in downlink. The OFDM symbol may also be called an SC-FDMA symbol or a symbol period. The resource block is a resource allocation unit and includes a plurality of contiguous subcarriers in one slot.

FIG. 1(b) shows the type 2 radio frame structure.

The type 2 radio frame structure includes 2 half frames each having a length of 153600*T_s=5 ms. Each of the half frames includes 5 subframes each having a length of 30720*T_s=1 ms.

In the type 2 radio frame structure of a TDD system, an uplink-downlink configuration is a rule showing how uplink and downlink are allocated (or reserved) with respect to all of subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, "D" indicates a subframe for downlink transmission, "U" indicates a subframe for uplink transmission, and "S" indicates a special subframe including the three fields of a downlink pilot time slot (DwPTS), a guard period (GP), and an uplink pilot time slot (UpPTS) for each of the subframes of the radio frame.

The DwPTS is used for initial cell search, synchronization or channel estimation by a UE. The UpPTS is used for an eNB to perform channel estimation and for a UE to perform uplink transmission synchronization. The GP is an interval for removing interference occurring in uplink due to the multi-path delay of a downlink signal between uplink and downlink.

Each subframe i includes the slot 2i and the slot 2i+1 each having "T_slot=15360*T_s=0.5 ms."

The uplink-downlink configuration may be divided into seven types. The location and/or number of downlink subframes, special subframes, and uplink subframes are different in the seven types.

A point of time changed from downlink to uplink or a point of time changed from uplink to downlink is called a switching point. Switch-point periodicity means a cycle in which a form in which an uplink subframe and a downlink subframe switch is repeated in the same manner. The switch-point periodicity supports both 5 ms and 10 ms. In the case of a cycle of the 5 ms downlink-uplink switching point, the special subframe S is present in each half frame. In the case of the cycle of the 5 ms downlink-uplink switching point, the special subframe S is present only in the first half frame.

In all of the seven configurations, No. 0 and No. 5 subframes and DwPTSs are an interval for only downlink transmission. The UpPTSs, the subframes, and a subframe subsequent to the subframes are always an interval for uplink transmission.

Both an eNB and a UE may be aware of such uplink-downlink configurations as system information. The eNB may notify the UE of a change in the uplink-downlink allocation state of a radio frame by sending only the index of configuration information whenever uplink-downlink configuration information is changed. Furthermore, the configuration information is a kind of downlink control information. Like scheduling information, the configuration information may be transmitted through a physical downlink control channel (PDCCH) and may be transmitted to all of UEs within a cell in common through a broadcast channel as broadcast information.

Table 2 shows a configuration (i.e., the length of a DwPTS/GP/UpPTS) of the special subframe.

FIG. 3 illustrates a structure of a downlink subframe in the wireless communication system to which the present disclosure can be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

FIG. 4 illustrates a structure of an uplink subframe in a wireless communication system to which the present disclosure may be applied.

TABLE 2

| Special subframe configuration | Normal cyclic prefix in downlink | | | Extended cyclic prefix in downlink | | |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of the radio frame according to the example of FIG. 1 is only one example. The number of subcarriers included in one radio frame, the number of slots included in one subframe, and the number of OFDM symbols included in one slot may be changed in various manners.

FIG. 2 is a diagram illustrating a resource grid for one downlink slot in the wireless communication system to which the present disclosure can be applied.

Referring to FIG. 2, one downlink slot includes the plurality of OFDM symbols in the time domain. Herein, it is exemplarily described that one downlink slot includes 7 OFDM symbols and one resource block includes 12 sub-carriers in the frequency domain, but the present disclosure is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

Referring to FIG. 4, an uplink subframe may be divided into a control region and a data region in the frequency domain. A physical uplink control channel (PUCCH) carrying uplink control information is allocated to the control region. A physical uplink shared channel (PUSCH) carrying user data is allocated to the data region. In order to maintain a single carrier characteristic, one UE does not transmit a PUCCH and a PUSCH at the same time.

A resource block (RB) pair is allocated to a PUCCH for one UE within a subframe. RBs belonging to an RB pair occupy different subcarriers in each of two slots. An RB pair allocated to a PUCCH is said to be frequency-hopped at a slot boundary.

Multi-Input Multi-Output (MIMO)

Different from the conventional way of using a single transmission antenna and a single reception antenna, a MIMO technology uses multi-transmission (Tx) antennas and multi-reception (Rx) antennas. In other words, the MIMO technology is a technology intended to increase capacity or enhance performance by using a multi-input and multi-output antenna in the transmission or reception end of a wireless communication system. In what follows, 'MIMO' will be referred to as a 'multi-input multi-output antenna'.

More specifically, the multi-input multi-output antenna technology does not depend on a single antenna path in order to receive a single total message but completes the whole data by collecting a plurality of data segments received through multiple antennas. As a result, the multi-input multi-output antenna technology may increase a data transfer rate within a specific system range and may also increase system coverage through a specific data transfer rate.

It is expected that an efficient multi-input multi-output antenna technology will be definitely needed because the next-generation mobile communication requires a data transfer rate much higher than that of existing mobile communication. In such a situation that requires a much higher data transfer rate, the MIMO communication technology is regarded as a next-generation mobile communication technology that may be widely used for mobile communication UEs and repeaters and is getting great attention as a technology which may overcome a limit to the transfer rate of other mobile communication technologies in a critical situation due to rapid expansion of data communication.

Meanwhile, among various transmission efficiency enhancing technologies under development, the multi-input multi-output antenna (MIMO) technology is currently getting the greatest attention as a method capable of significantly improving communication capacity and transmission/reception performance even without allocation of additional frequencies or without increasing power.

FIG. 5 illustrates a structure of a general MIMO communication system.

Referring to FIG. 5, if the number of transmission (Tx) antennas is increased to $N_T$ and the number of reception (Rx) antennas is increased to $N_R$ at the same time, a theoretical channel transmission capacity is increased in proportion to the number of antennas unlike the case where a plurality of antennas is used only in a transmitter or a receiver. Accordingly, a transfer rate may be improved, and frequency efficiency may be improved significantly. In this case, the transfer rate according to an increase of a channel transmission capacity may be increased theoretically by as much as the maximum transfer rate $R_o$ obtained from a single antenna multiplied by the following increase rate $R_i$.

$$R_i = \min(N_T, N_R) \quad [\text{Eq. 1}]$$

In other words, an MIMO communication system using 4 transmission antennas and 4 reception antennas, for example, may achieve four times the transfer rate of a single antenna system.

The multi-input multi-output antenna technology may be divided into a spatial diversity method for increasing transmission reliability by using symbols passing through various channel paths and a spatial multiplexing method for improving a transfer rate by transmitting a plurality of data symbols at the same time by using a plurality of transmission antennas. Furthermore, a large amount of research is being carried out recently on a method for obtaining the respective advantages of the two methods by combining the two methods properly.

Each of the methods will be described in more detail below.

First, the spatial diversity method is further divided into space-time block code-based methods and space-time Trelis code-based methods that uses a diversity gain and a coding gain at the same time. In general, the Trelis code-based method is better in terms of bit error rate improvement performance and degree of freedom for code generation, whereas the space-time block code-based method exhibits low computational complexity. The spatial diversity gain may be obtained as the product ($N_T \times N_R$) of the number of transmission antennas ($N_T$) and the number of reception antennas ($N_R$).

Second, the spatial multiplexing technique is a method of transmitting different data strings at each transmitting antenna, and mutual interference occurs at the receiver between data transmitted simultaneously from the transmitters. The receiver receives the data after removing the mutual interference by using an appropriate signal processing technique. Noise removal techniques used here include the maximum likelihood detection (MLD) method, zero-forcing (ZF) method, minimum mean square error (MMSE) method, Diagonal-Bell Laboratories Layered Space-Time (D-BLAST) method, and Vertical-Bell Laboratories Layered Space-Time (V-BLAST) method. In particular, when the transmitting end knows channel information, the singular value decomposition (SVD) method may be used.

Third, the spatial diversity and spatial multiplexing techniques may be used in combination. The use of the spatial diversity technique alone gradually saturates a performance improvement gain as a diversity order is increased while, when the spatial multiplexing technique is used alone, transmission reliability is deteriorated in a wireless channel. Therefore, methods for solving the problem above and obtaining benefits from both of the techniques have been studied, which include Double space-time transmission delivery (Double-STTD) and space-time bit-interleaved coded modulation (STBICM).

In order to describe a communication method in the multi-input multi-output antenna system as described above in more detail, a mathematical model may be expressed as follows.

First, as shown in FIG. 5, it is assumed that there are $N_T$ transmission antennas and $N_R$ reception antennas.

First, referring to a transmission signal, if there are $N_T$ transmission antennas as described above, the maximum number of information that may be transmitted is $N_T$, which may be represented by the following vector.

$$s = [s_1, s_2, \ldots, s_{N_T}]^T \quad [\text{Eq. 2}]$$

Meanwhile, different transmission power may be applied for each transmission information $s_1, s_2, \ldots, s_{N_T}$; if the transmission power is denoted as $P_1, P_2, \ldots, P_{N_T}$, transmission information for which transmission power has been adjusted may be expressed by the following vector.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad [\text{Eq. 3}]$$

Also, the transmission information with adjusted transmission power of Eq. 3 may be expressed by using a diagonal matrix P the diagonal entries of which represent transmission power.

$$\hat{s} = \begin{bmatrix} P_1 & & 0 \\ & P_2 & \\ & & \ddots \\ 0 & & P_{N_T} \end{bmatrix} \begin{bmatrix} s_1 \\ s_2 \\ \vdots \\ s_{N_T} \end{bmatrix} = Ps \quad [\text{Eq. 4}]$$

Meanwhile, the information vector of which the transmission power of Eq. 4 has been adjusted is then multiplied by a weight matrix W to form $N_T$ transmission signals $x_1, x_2, \ldots, x_{N_T}$ that are actually transmitted. Here, the weight matrix plays a role of appropriately distributing transmission information to each antenna according to a transmission channel condition. The transmission signals $x_1, x_2, \ldots, x_{N_T}$ may be expressed by using a vector x as shown below.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Eq. 5]}$$

Here, $w_{ij}$ represents a weight between the i-th transmission antenna and the j-th transmission information, and W represents this weight distribution in a matrix form. The matrix W is referred to as a weight matrix or a precoding matrix.

Meanwhile, the transmission signal x as described above may be considered for a case when spatial diversity is used and for a case when spatial multiplexing is used.

If spatial multiplexing is used, since different signals are multiplexed to be transmitted, elements of the information vector s have different values from each other. On the other hand, if spatial diversity is used, since the same signal is transmitted through different channel paths, all of the elements of the information vector s have the same value.

It should be noted that the spatial multiplexing and the spatial diversity may be used in combination. In other words, it may be possible to transmit the same signal through 3 transmission antennas according to the spatial diversity method and to transmit the remaining different signals according to the spatial multiplexing method.

Next, when $N_R$ reception antennas are used to receive a signal, a reception signal of each antenna $y_1, y_2, \ldots, y_{N_T}$ may be expressed by the following vector y.

$$y = [y_1, y_2, \ldots, y_N R]^T \quad \text{[Eq. 6]}$$

Meanwhile, when a channel is modeled for a multi-input multi-output antenna communication system, each channel may be distinguished by a transmission and reception antenna index, and a channel between a transmission antenna j and a reception antenna i will be denoted as $h_{ij}$. Here, it should be noted that the index of a reception antenna comes first in the channel index of $h_{ij}$, followed by the index of a transmission antenna.

The channels may be grouped to be expressed in a vector or matrix form. An example of a vector expression may be described as follows.

FIG. 6 illustrates a channel from a plurality of transmission antennas to one reception antenna.

As shown in FIG. 6, a channel starting from a total of $N_T$ transmission antennas and arriving at a reception antenna i may be expressed as follows.

$$h_i^T = [h_{i1}, h_{i2}, \ldots, h_{iN_T}] \quad \text{[Eq. 7]}$$

Also, when all of the channels from $N_T$ transmission antennas to $N_R$ reception antennas are expressed according to Eq. 7, a resulting expression may be given as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Eq. 8]}$$

Meanwhile, in the case of an actual channel, an additive white Gaussian noise is added to the channel matrix H, the while noise $n_1, n_2, \ldots, n_{N_R}$ added to each of the $N_R$ reception antennas may be expressed by a vector form as follows.

$$n = [n_1, n_2, \ldots, n_{N_R}]_T \quad \text{[Eq. 9]}$$

Through modeling of the transmission signal, reception signal, channel, and white noise as described above, each element of a multi-input multi-output antenna communication systems may be represented by the following relationship.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{12} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Eq. 10]}$$

$$Hx + n$$

Meanwhile, the number of rows and columns of the channel matrix H indicating the state of a channel is determined by the numbers of transmission and reception antennas. As described above, the number of rows in the channel matrix H is equal to the number of reception antennas $N_R$, and the number of columns in the channel matrix H is equal to the number of transmission antennas $N_T$. In other words, the channel matrix H becomes an $N_R \times N_T$ matrix.

In general, the rank of a matrix is defined by the minimum of the number of independent rows or columns. Therefore, a matrix rank is not allowed to be greater than the number of rows or columns. To give a mathematical example, the rank of the channel matrix H is limited as follows.

$$\text{rank}(H) \leq \min(N_T, N_R) \quad \text{[Eq. 11]}$$

Also, if a matrix is subject to eigenvalue decomposition, the rank of the matrix may be defined as the number of non-zero eigenvalues. Similarly, if singular value decomposition (SVD) is applied, the rank may be defined as the number of non-zero singular values. Therefore, a physical interpretation of the rank of a channel matrix may be regarded as representing the maximum number of different information that is transmitted through a given channel.

In the present specification, the 'rank' for MIMO transmission represents the number of paths through which a signal may be transmitted independently at a specific time point and a specific frequency resource, and the 'number of layers' represents the number of signal streams transmitted through each individual path. In general, since a transmitting end transmits as many layers as the rank number used for signal transmission, the rank has the same indication as the number of layers unless otherwise specified.

Reference Signal (RS)

Since data is transmitted over a wireless channel in a wireless communication system, a signal may be distorted during transmission. In order to correctly receive the distorted signal at a receiving end, distortion of the received signal has to be corrected using channel information. In order to detect channel information, methods that transmit a signal known to both of a transmitting side and a receiving side and methods that detect channel information using degree of distortion made when a signal is transmitted through a channel are largely used. The aforementioned signal is called a pilot signal or a reference signal (RS).

Different from the conventional way of using a single transmission antenna and a single reception antenna, most of recent mobile communication systems employ multi-transmission antennas and multi-reception antennas to transmit packets in an attempt to improve transmission and reception data efficiency. In order to receive a signal correctly during transmission and reception of data using multi-input multi-output antennas, channel states between transmission and reception antennas has to be detected. Therefore, each transmission antenna needs to have a separate reference signal.

In a mobile communication system, an RS may be classified into two types according to its purpose: an RS used for acquiring channel information and an RS used for data demodulation. Since the former RS is intended to be used by a UE to obtain channel state information for downlink transmission, it has to be transmitted over a broadband network, and even a UE that does not receive downlink data in a specific subframe has to be capable of receiving and measuring the RS. Also, the former RS is used for radio resource measurement (RRM) such as handover. When an eNB performs downlink transmission, the latter RS transmitted together to the corresponding resource. Upon receiving the corresponding RS, the UE may perform channel estimation and thus, demodulate data. The latter RS has to be transmitted to a region in which data is transmitted.

Downlink reference signals are divided into one common reference signal (CRS) used for obtaining information about a channel state shared by all of the UEs within a cell and measurement such as handover and a dedicated reference signal (DRS) used for data demodulation only for a specific UE. By using the reference signals, information for demodulation and channel measurement may be provided. In other words, a DRS may be used only for data demodulation, and a CRS may be used for both purposes of channel information acquisition and data demodulation.

A receiving side (namely, UE) measures a channel state from a CRS and provides an indicator related to channel quality such as Channel Quality Indicator (CQI), Precoding Matrix Index (PM) and/or Rank Indicator (RI) to a transmitting side (namely, eNB) as feedback. The CRS is also referred to as a cell-specific RS. On the other hand, a reference signal related to feedback of channel state information (CSI) may be defined as a CSI-RS.

A DRS may be transmitted through resource elements when data demodulation is needed on a PDSCH. A UE may receive existence of a DRS through higher layer signaling, which is valid only when the corresponding PDSCH is mapped. A DRS may be referred to as a UE-specific RS or a Demodulation RS (DMRS).

CSI-RS Configuration

In the current LTE standard, parameters for a CSI-RS configuration include antennaPortsCount, subframeConfig, and resourceConfig. These parameters indicate how many antenna ports transmit a CSI-RS, the period and offset of a subframe to which the CSI-RS is transmitted, at which resource element (RE) location (for example, frequency and OFDM symbol index) of the corresponding subframe the CSI-RS is transmitted, and so on. Specifically, an eNB transmits parameters/information including the following contents when the eNB transmits a specific CSI-RS configuration to a UE.

antennaPortsCount: Parameter that represents the number of antenna ports used for transmission of CSI reference signals (for example, 1 CSI-RS port, 2 CSI-RS ports, 4 CSI-RS ports, or 8 CSI-RS ports)

resourceConfig: Parameter regarding a CSI-RS allocation resource location subframeConfig: Parameter regarding a period and an offset of a subframe to which a CSI-RS is transmitted p-C: Regarding UE assumption on reference PDSCH transmitted power for CSI feedback CSI-RS, Pc is the assumed ratio of PDSCH EPRE to CSI-RS EPRE when UE derives CSI feedback and takes values in the range of [−8, 15] dB with 1 dB step size zeroTxPowerResourceConfigList: Parameter regarding a zero-power CSI-RS configuration zeroTxPowerSubframeConfig: Parameter regarding a period and an offset of a subframe to which a zero-power CSI-RS is transmitted Massive MIMO A MIMO system having a plurality of antennas may be referred to as a massive MIMO system, which is receiving attention as a means for improving spectral efficiency, energy efficiency, and processing complexity.

Recently, the 3GPP started a discussion about a massive MIMO system to satisfy requirements on spectral efficiency of a future mobile communication system. A massive MIMO system is also called a full-dimension MIMO (FD-MIMO).

Introduction of an active antenna system (AAS) is being considered for wireless communication systems after the LTE release-12.

Unlike the existing passive antenna system in which an amplifier capable of adjusting the phase and size of a signal and an antenna are separated from each other, the AAS refers to a system in which each antenna is constructed to include an active element such as an amplifier.

The AAS does not require a separate cable, connector and other hardware for connecting an amplifier and an antenna because an active antenna is used and thus has a high efficiency in terms of energy and operating costs. In particular, since the AAS supports an electronic beam control method for individual antennas, the AAS enables an advanced MIMO technology such as formation of an accurate beam pattern or 3D beam pattern that requires sophisticated control of a beam direction and a beam width.

Due to the introduction of an advanced antenna system such as the AAS, a massive MIMO structure having a plurality of input/output antennas and a multi-dimensional antenna structure is also considered. For example, unlike the existing straight type antenna array, if a two-dimensional (2D) antenna array is formed, a 3D beam pattern may be formed by the active antenna of the AAS.

FIG. 7 illustrates a 2D active antenna system having 64 antenna elements in a wireless communication system to which the present disclosure may be applied.

FIG. 7 illustrates a common 2D antenna array, and for an illustrative purpose, a case where $N_t = N_v \cdot N_h$ antennas form a square shape as in FIG. 7 may be considered. In this case, $N_v$ denotes the number of antenna columns in the horizontal direction, and $N_h$ denotes the number of antenna rows in the vertical direction.

When the 2D antenna array structure is used, a radio wave may be controlled for both of the vertical (elevation) and horizontal (azimuth) directions so that a transmission beam is controlled in the 3D space. This kind of wave control mechanism may be referred to as 3D beamforming.

FIG. 8 illustrates a system having a plurality of transmission/reception antennas by which an eNB or a UE may perform AAS-based three-dimensional (3D) beam forming in a wireless communication system to which the present disclosure may be applied.

FIG. 8 is a diagram of the example described above and illustrates a 3D MIMO system using a 2D antenna array (namely, 2D-AAS).

From the point of view of a transmission antenna, if a 3D beam pattern is used, a semi-static or dynamic beam may be formed in the vertical direction of the beam in addition to the horizontal direction. For example, an application such as formation of a sector in the vertical direction may be considered.

Furthermore, from the point of view of a reception antenna, when a reception beam is formed using a massive reception antenna, a signal power rise effect according to an antenna array gain may be expected. Accordingly, in the case of the uplink, an eNB may receive a signal from a UE through a plurality of antennas. In this case, there is an advantage in that the UE may set its transmission power very low by considering the gain of the massive reception antenna in order to reduce the interference effect.

FIG. 9 illustrates a 2D antenna system showing cross polarization in a wireless communication system to which the present disclosure may be applied.

A 2D planar antenna array model in which polarization is considered may be diagrammed as in FIG. 8.

Different from an existing MIMO system employing a passive antenna, a system based on an active antenna may dynamically adjust gain of an antenna element by applying a weight to an active element (for example, an amplifier) attached to (or included in) each antenna element. Since a radiation pattern depends on antenna arrangement such as the number of antenna elements and antenna spacing, an antenna system may be modeled at the antenna element level.

The antenna array model as shown in FIG. 9 may be represented by (M, N, P) which corresponds to parameters characterizing an antenna array structure.

M represents the number of antenna elements (namely, the number of antenna elements with a slant of +45 degrees in each column or the number of antenna elements with a slant of −45 degrees in each column) having the same polarization in each column (namely, in the vertical direction).

N represents the number of columns in the horizontal direction (namely, the number of antenna elements in the horizontal direction).

P represents the number of dimensions of polarization. In the case of cross polarization as shown in FIG. 11, P=2, but in the case of co-polarization, P=1.

An antenna port may be mapped to a physical antenna element. An antenna port may be defined by a reference signal related to the corresponding antenna port. For example, in the LTE system, antenna port 0 may be related to a cell-specific reference signal (CRS), and antenna port 6 may be related to a positioning reference signal (PRS).

As one example, an antenna port may be one-to-one mapped to a physical antenna element. This example may correspond to a case where a single cross polarization antenna element is used for downlink MIMO or downlink transmission diversity. For example, while antenna port 0 is mapped to one physical antenna element, antenna port 1 may be mapped to another physical antenna element. From the viewpoint of a UE, this case may be regarded as two downlink transmissions. One is related to a reference signal for antenna port 0, and the other one is related to a reference signal for antenna port 1.

As another example, a single antenna port may be mapped to a plurality of physical antenna ports. This example may correspond to a case used for beamforming. As beamforming uses a plurality of physical antenna elements, downlink transmission may be made to be directed to a specific UE. In most cases, beamforming may be achieved by using an antenna array comprising a plurality of columns of a plurality of cross polarization antenna elements. From the viewpoint of a UE, this case may be regarded as single downlink transmission originated from a single antenna port. One is related to a CRS for antenna port 0, and the other one is related to a CRS for antenna port 1.

In other words, an antenna port represents downlink transmission from the viewpoint of a UE rather than actual downlink transmission transmitted from a physical antenna element of an eNB.

As yet another example, a plurality of antenna ports may be used for downlink transmission, but each antenna port may be mapped to a plurality of physical antenna elements. This example may correspond to a case where an antenna array is used for downlink MIMO or downlink diversity. For example, antenna port 0 and 1 may be mapped to a plurality of physical antenna elements, respectively. From the viewpoint of a UE, this case may be regarded as two downlink transmissions. One is related to a reference signal for antenna port 0, and the other one is related to a reference signal for antenna port 1.

In an FD-MIMO system, MIMO precoding of a data stream may go through antenna port virtualization, transceiver unit (TXRU) virtualization, and antenna element pattern.

During antenna port virtualization, a stream on an antenna port is precoded on a TXRU. In the TXRU virtualization, a TXRU signal is precoded on an antenna element. In the antenna element pattern, a signal radiated from an antenna element may have a directional gain pattern.

In the conventional transceiver modeling, static one-to-one mapping is assumed between an antenna port and a TXRU, and the TXRU virtualization effect is combined into a static (TXRU) antenna pattern that includes both of the effects from the TXRU virtualization and the antenna element pattern.

Antenna port virtualization may be performed in a frequency-selective manner. In the LTE, an antenna port is defined together with a reference signal (or pilot). For example, for transmission of precoded data on an antenna port, a DMRS is transmitted with a data signal over the same bandwidth, and both of the DMRS and the data are precoded by the same precoder (or the same TXRU virtualization precoding). A CSI-RS is transmitted through a plurality of antenna ports for CSI measurement. In performing CSR-RS transmission, a precoder that characterizes mapping between a CSI-RS port and a TXRU is designed by a unique matrix so that a UE may estimate a TXRU virtualization precoding matrix for a data precoding vector.

One dimensional (1D) TRXU virtualization and two dimensional (2D) TXRU virtualization are under consideration as a TXRU virtualization method, which will be described with reference to a related drawing.

FIG. 10 illustrates a transceiver unit model in a wireless communication system to which the present disclosure may be applied.

Regarding 1D TXRU virtualization, $M_{TXRU}$ TXRUs are related to M antenna elements forming a single column antenna array having the same polarization.

Regarding 2D TXRU virtualization, a TXRU model configuration corresponding to the antenna array model configuration (M, N, P) of FIG. 11 may be denoted by ($M_{TXRU}$, N, P). Here, $M_{TXRU}$ represents the number of TXRUs present in the 2D same column and same polarization, and $M_{TXRU} \leq M$ is always satisfied. In other words, the total number of TXRUs equals to $M_{TXRU} \times N \times P$.

Depending on a correlation between antenna elements and a TXRU, the TXRU virtualization model may be divided into a TXRU virtualization model option-1 (sub-array partition model) as shown in FIG. 12(*a*) and a TXRU virtualization model option-2 (full-connection) model as shown in FIG. 12(*b*).

Referring to FIG. 10(*a*), in the case of sub-array partition model, antenna elements are partitioned into a plurality of antenna element groups, and each TXRU is connected to one of the groups.

Referring to FIG. 10(*b*), in the case of full-connection model, a plurality of TXRU signals are combined to be transmitted to a single antenna element (or an array of antenna elements).

In FIG. 10, q is a transmission signal vector comprising M antenna elements column co-polarized in the same direction within a single column. w is a wideband TXRU virtualization weight vector, and W is a wideband TXRU virtualization weight matrix. x is a signal vector comprising $M_{TXRU}$ TXRUs.

Here, mapping between antenna ports and TXRUs may be 1-to-1 or 1-to-many.

FIG. 10 shows only an example of TXRU-to-element mapping, and the present disclosure is not limited to the example; therefore, the present disclosure may be applied the same even for mapping between antenna elements and a TXRU that may be implemented in various other forms from the viewpoint of hardware.

Quasi Co-Located (QCL) Between Antenna Ports

The present disclosure considers a method for performing demodulation by using a UE-specific RS such as a DMRS when a UE receives data (for example, PDSCH). Since the DMRS is transmitted together only with a scheduled RB(s) of the corresponding PDSCH and is transmitted only over a time period during which a scheduled PDSCH is transmitted, there may be a limit to reception performance in performing channel estimation based only on the corresponding DMRS itself. For example, in performing channel estimation, an estimate of a main large-scale parameter/property (LSP) of a radio channel is needed, and DMRS density may not be sufficient to obtain the estimate only from the DMRS present in the time/frequency region to which the scheduled PDSCH is transmitted. Therefore, to support implementation of such a UE, the LTE-A standard defines quasi co-location signaling/assumption/behavior between RS ports as follows and support methods for configuring/operating a UE according to the definition.

QC/QCL (Quasi Co-Located or Quasi Co-Location) may be defined as follows.

If two antenna ports are in a QC/QCL relationship (or become QC/QCL), a UE may assume that the large-scale property of a signal transmitted through one antenna port may be inferred from the signal transmitted through another antenna port. At this time, the large-scale property includes one or more of delay spread, Doppler spread, frequency shift, average received power, and received timing.

Or it may be defined as follows. If two antenna ports are in a QC/QCL relationship (or become QC/QCL), the UE may assume that the large-scale property of a signal transmitted through one antenna port may be inferred from a radio channel through which one symbol is transmitted through the other antenna port. Here, the large-scale property includes one or more of delay spread, Doppler spread, Doppler shift, average gain, and average delay.

In other words, if two antenna ports are in a QC/QCL relationship (or become QC/QCL), it indicates that the large-scale property of a radio channel through one antenna port is the same as the large-scale property of a radio channel through another antenna port. Taking into account a plurality of antenna ports to which an RS is transmitted, if antenna ports through which two different types of RSs are transmitted are in the QCL relationship, the large-scale property of a radio channel through one type of antenna port may be replaced with the large-scale property of a radio channel through the other type of antenna port.

In the present specification, the QC/QCL related definitions are not distinguished from each other. In other words, the QC/QCL concept may follow one of the definitions above. Similarly, the definition of the QC/QCL concept may be modified such that the UE may regard the antenna ports satisfying the QC/QCL assumption as transmitting a radio signal as if they were at the same location (co-located) (for example, the UE may regard that they are transmitting a radio signal at the same transmission point), and the technical principles of the present disclosure includes modifications similar to the example above. In the present disclosure, for the convenience of description, the QC/QCL related definitions are used interchangeably.

According to the QC/QCL concept, a UE may not consider non-QC/QCL antenna ports to have the same large-scale property between radio channels through the corresponding antenna ports. In other words, the UE has to perform processing separately for non-QC/QCL antenna ports configured separately for timing acquisition and tracking, frequency offset estimation and compensation, and delay estimation and Doppler estimation.

Antenna ports that may be assumed to satisfy the QC/QCL relationship provide an advantage in that the UE may perform the following operation:

Regarding delay spread and Doppler spread, the UE may apply the estimation result of power-delay-profile, delay spread and Doppler spectrum, and Doppler spread through one particular antenna port in the same manner to the Wiener filter used for estimation of a radio channel through another antenna port.

Regarding frequency shift and received timing, after performing time and frequency synchronization on one particular antenna port, the UE may apply the same synchronization to demodulation of another antenna port.

Regarding average receive power, the UE may average Reference Signal Received Power (RSRP) measurements of two or more antenna ports.

For example, suppose a DMRS antenna port for demodulation of a downlink data channel becomes QC/QCL with a CRS antenna port of a serving cell. Then, the UE may apply large-scale properties of a radio channel estimated through the UE's CRS antenna port at the time of channel estimation through the corresponding DMRS antenna port in the same manner to improve the DMRS based downlink data channel receive performance.

This is possible because a CRS is a reference signal broadcast with a relatively high density for each subframe and over the whole frequency band, and an estimate for the large-scale property may be obtained from the CRS more reliably. On the other hand, since a DMRS is transmitted in a UE-specific manner for a specifically scheduled RB, and a Precoding Resource block Group (PRG) unit may change the precoding matrix used for transmission by an eNB, an effective channel received by the UE may change in PRG units, and thus even if a plurality of PRGs are scheduled, performance degradation may occur when the DMRS is used for estimation of large-scale property of a radio channel across a large frequency band. Also, since the transmission period of a CSI-RS may become a few to tens of milliseconds and has low average density for each resource block, 1 resource element per antenna port, performance degradation may also occur when the CSI-RS is used for estimation of large-scale property of a radio channel.

In other words, by assuming the QC/QCL relationship between antenna ports, a UE may use the assumption for detection/reception of a downlink reference signal, channel estimation, and channel state report.

Meanwhile, the UE may assume that antenna ports 0 to 3 of a serving cell and an antenna port for PSS/SSS have the QCL relationship with respect to the Doppler shift and average delay.

Definition of Channel State Information-Reference Signal (CSI-RS)

In the case of a serving cell and a UE for which transmission mode 9 is set, one CSI-RS resource configuration may be set for the UE. In the case of a serving cell and a UE for which transmission mode 10 is set, one or more CSI-RS resource configuration(s) may be set for the UE. The following parameters for a UE that has to assume non-zero transmission power with respect to a CSI-RS are configured through higher layer signaling for the respective CSI-RS resource configurations:

CSI-RS resource configuration identifier (when transmission mode 10 is set)
The number of CSI-RS ports
CSI-RS configuration
CSI-RS subframe configuration I_CSI-RS
UE assumption on reference PDSCH transmission power for CSI feedback (P_c) (when transmission mode 9 is set for the UE)
UE assumption on reference PDSCH transmission power for CSI feedback (P_c) with respect to each CSI process when transmission mode 10 is set for the UE. If CSI subframe sets C_(CSI, 0) and C_(CSI, 1) are configured by the higher layer with respect to a CSI process, P_c is configured for each CSI subframe set of the CSI process.
Pseudo-random sequence generator parameter (n_ID)
CDM type parameter when a UE is configured with a higher layer parameter CSI-Reporting-Type, and the CSI reporting type is set to 'CLASS A' with respect to a CSI process.
A higher layer parameter qct-CRS-Infor-r11 with respect to UE assumption of QCL type B of CRS antenna ports and CSI-RS antenna ports having the following parameters:
qct-ScramblingIdentity-r11
crs-PortsCount-r11
mbsfn-SubframeConfigList-r11

P_c is an estimated ratio of PDSCH Energy Per Resource Element (EPRE) to CSI-RS EPRE, when a UE derives CSI feedback and takes a value within a range of [−8, 15] dB with a step size of 1 dB, where PDSCH EPRE corresponds to the number of symbols for a ratio of PDSCH EPRE to cell-specific RS EPRE.

The UE does not expect configuration of a CSI-RS and a PMCH in the same subframe of a serving cell.

In the case of a serving cell of frame structure type 2 and 4 CRS antenna ports, the UE does not expect to receive a CSI-RS configuration index belonging to the [20-31] set in the case of a normal Cyclic Prefix (CP) or the [16-27] set in the case of an extended CP.

The UE may assume that CSI-RS antenna ports set by the CSI-RS resource configuration have a QCL relationship with respect to delay spread, Doppler spread, Doppler shift, average gain, and average delay.

The UE for which transmission mode 10 and QCL type B are configured may assume that antenna ports 0-3 are associated with qcl-CRS-Infor-r11 corresponding to the CSI-RS resource configuration and antenna ports 15-22 corresponding to the CSI-RS resource configuration have a QCL relationship with respect to Doppler spread and Doppler shift.

If a UE is configured with transmission mode 10 and higher layer parameter CSI-Reporting-Type, CSI-Reporting-Type is set to 'CLASS B', the number of CSI-RS resources configured for a CSI process is one or more, and QCL type B is configured, the UE does not expect to receive a CSI-RS resource configuration with respect to the CSI process having a value different from the higher layer parameter qcl-CRS-Info-r11.

In a subframe configured/set for CSI-RS transmission, a reference signal sequence $r_{l,n_s}(m)$ may be mapped to complex-valued modulation symbols $a_{k,l}^{(p)}$ used as reference symbols of an antenna port p. This mapping depends on the higher layer parameter CDMType.

If CDMtype does not correspond to CDM4, mapping may be performed according to Eq. 12 below.

$$a_{k,l}^{(p')} = w_{l''} \cdot r_{l,n_s}(m') \qquad [\text{Eq. 12}]$$

$$k = k' + 12m + \begin{cases} -0 & \text{for } p' \in \{15, 16\}, \text{normal cyclic prefix} \\ -6 & \text{for } p' \in \{17, 18\}, \text{normal cyclic prefix} \\ -1 & \text{for } p' \in \{19, 20\}, \text{normal cyclic prefix} \\ -7 & \text{for } p' \in \{21, 22\}, \text{normal cyclic prefix} \\ -0 & \text{for } p' \in \{15, 16\}, \text{extended cyclic prefix} \\ -3 & \text{for } p' \in \{17, 18\}, \text{extended cyclic prefix} \\ -6 & \text{for } p' \in \{19, 20\}, \text{extended cyclic prefix} \\ -9 & \text{for } p' \in \{21, 22\}, \text{extended cyclic prefix} \end{cases}$$

$$l = l' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

-continued $$w_{l''} = \begin{cases} 1 & p' \in \{15, 17, 19, 21\} \\ (-1)^{l''} & p' \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

If CDMtype corresponds to CDM4, mapping may be performed according to Eq. 13 below.

$$a_{k,l}^{(p')} = w_{p'}(i) \cdot r_{l,n_s}(m')$$ [Eq. 13]

$$k = k' + 12m - \begin{cases} k'' & \text{for } p' \in \{15, 16, 19, 20\}, \text{normal cyclic prefix}, N_{ports}^{CSI} = 8 \\ k'' + 6 & \text{for } p' \in \{17, 18, 21, 22\}, \text{normal cyclic prefix}, N_{ports}^{CSI} = 8 \\ 6k'' & \text{for } p' \in \{15, 16, 17, 18\}, \text{normal cyclic prefix}, N_{ports}^{CSI} = 4 \end{cases}$$

$$l = l' + \begin{cases} l'' & \text{CSI reference signal configurations 0-19, normal cyclic prefix} \\ 2l'' & \text{CSI reference signal configurations 20-31, normal cyclic prefix} \end{cases}$$

$$l'' = 0, 1$$

$$k'' = 0, 1$$

$$i = 2k'' + l''$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

$w_p(i)$ of Eq. 13 is determined by Table 6 below. Table 3 shows a sequence $w_p(i)$ with respect to CDM 4.

TABLE 3

| p' | | [$w_p$(0) $w_p$(1) $w_p$(2) $w_p$(3)] |
|---|---|---|
| $N_{ports}^{CSI} = 4$ | $N_{ports}^{CSI} = 8$ | |
| 15 | 15, 17 | [1 1 1 1] |
| 16 | 16, 18 | [1 −1 1 −1] |
| 17 | 19, 21 | [1 1 −1 −1] |
| 18 | 20, 22 | [1 −1 −1 1] |

OFDM Numerology

As more communication devices require greater communication capacity, a necessity of mobile broadband communication which is more improved than the existing radio access technology (RAT) has been raised. In addition, the massive Machine Type Communications (MTC) that provides various services anytime and anywhere by connecting a plurality of devices and objects is also one of important issues, which is considered in a next generation communication. Moreover, design of a communication system in which a service and/or a UE sensitive to reliability and latency is being discussed in the next-generation communication. As such, an introduction of a next generation RAT is under discussion, which considers enhanced mobile broadband communication, massive MTC, Ultra-Reliable and Low Latency Communication (URLLC), and the like, and such a technology may be collectively referred to as 'new RAT (NR)'.

A new RAT system uses an OFDM transmission method or a transmission method similar thereto, which typically has OFDM numerology of Table 4 below.

TABLE 4

| Parameter | Value |
|---|---|
| Subcarrier-spacing (Δf) | 60 kHz |
| OFDM symbol length | 16.33 μs |
| Cyclic Prefix(CP) length | 1.30 μs/1.17 μs s |
| System bandwidth | 80 MHz |
| No. of available subcarriers | 1200 |
| Subframe length | 0.25 ms |
| No. of OFDM symbols per subframe | 14 symbols |

Self-Contained Subframe Structure

In the TDD system, in order to minimize data transmission delay, the self-contained subframe structure as shown in FIG. 11 has been considered in the fifth generation new RAT.

FIG. 11 illustrates a self-contained subframe structure to which the present disclosure may be applied.

The hatched area in FIG. 11 shows a transmission region of a physical channel PDCCH for transmission of DCI, and the dark area shows a transmission region of a physical channel PUCCH for transmission of Uplink Control Information (UCI).

Control information transmitted to a UE by an eNB through DCI includes information about a cell configuration that the UE has to know, DL specific information such as DL scheduling, and/or UL specific information such as a UL grant. Also, control information transmitted to the eNB by the UE through UCI includes ACK/NACK report of HARQ about DL data, CSI report about DL channel state, and/or Scheduling Request (SR).

The area without any mark in FIG. 11 may be used for a physical channel PDSCH transmission region for downlink data or a physical channel PUSCH transmission region for uplink data. In the characteristics of such a structure, DL transmission and UL transmission may be sequentially progressed in a subframe so that DL data is transmitted and a UL ACK/NACK is received within the corresponding subframe. Consequently, according to the present disclosure, when a data transmission error occurs, a time required until data retransmission is reduced, and owing to this, latency in forwarding the last data may be minimized.

In the self-contained subframe structure, a time gap is required for a process in which an eNB and a UE switch from a transmission mode to a reception mode or vice versa. For this purpose, part of OFDM symbols may be setup as GP at the time of switching from DL to UL in a subframe structure, and such a subframe type may be referred to as 'self-contained SF'.

Analog Beamforming

In Millimeter Wave (mmW) band, since wavelength becomes short, a larger number of antenna elements may be installed in a given area. In other words, the wavelength in 30 GHz band is 1 cm, and accordingly, a total of 64 (8×8) antenna elements may be installed in the form of a 2D array with 0.5 lambda (wavelength) intervals on a 5 cm by 5 cm panel. Therefore, in the mmW band, beamforming (BF) gain is controlled by using a plurality of antenna elements to increase coverage or improve throughput.

In this case, if a Transceiver Unit (TXRU) is provided to control transmission power and adjust phase of each antenna element, independent beamforming becomes available for each frequency resource. However, it is not effective in terms of costs to install TXRUs to all of the antenna elements the number of which is 100 or more. Accordingly, a method for mapping a plurality of antenna elements to a single TXRU and adjusting a beam direction by using an analog phase shifter is under consideration. Such an analog beamforming technique exhibits a drawback in that it is not able to perform frequency selective beamforming since only one beam direction is allowed throughout the whole frequency band.

As an intermediate form using a digital BF and an analog BF, a hybrid BF having B TXRUs, the number of which is smaller than the number of antenna elements Q, may be considered. In this case, the number of directions of beams that may be transmitted simultaneously is limited to be smaller than B, even though there exists a difference due to a scheme for connecting B TXRUs and Q antenna elements.

Also, a hybrid beamforming technique that combines digital beamforming and analog beamforming is receiving great attention for those cases when a plurality of antennas are used in the New RAT system. At this time, analog beamforming (or radio frequency (RF) beamforming) represents an operation that performs precoding (or combining) at the RF stage. In hybrid beamforming, the baseband and RF blocks each perform precoding (or combining), providing an advantage in that performance comparable to that of digital beamforming may be obtained while a smaller number of RF chains and digital/analog (D/A) (or A/D) converters are used. For the sake of convenience, a hybrid beamforming structure may be expressed by N transceiver units (TXRUs) and M physical antennas. Then digital beamforming for L data layers to be transmitted from a transmitting end may be expressed by an N-by-L matrix, and N transformed digital signals are then transformed to analog signals through TXRUs, after which analog beamforming expressed by an M-by-N matrix is applied.

FIG. 12 illustrates a hybrid beamforming structure from a perspective of a TXRU and a physical antenna. FIG. 12 assumes a situation where the number of digital teams is L, and the number of analog beams is N.

The New RAT system is designed so that an eNB may modify analog beamforming at a symbol level in an attempt to support more efficient beamforming for UEs located in a specific region. Furthermore, as shown in FIG. 12, if N specific TXRUs and M RF antennas are defined together as a single antenna panel, the New RAT system even considers adopting a plurality of antenna panels to which independent hybrid beamforming may be applied.

When an eNB uses a plurality of analog beams, analog beams that are advantageous for signal reception may vary for each UE. Therefore, a beam sweeping operation is considered, which changes a plurality of analog beams to be applied by the eNB for a specific subframe (SF) with respect to each symbol at least for synchronization signal, system information, paging, and the like so that all of the UEs may have a reception opportunity.

FIG. 13 illustrates a beam sweeping operation for a synchronization signal and system information in a DL transmission process.

In FIG. 13, a physical resource (or physical channel) to which system information of the New RAT system is transmitted via a broadcasting scheme is referred to as a physical broadcast channel (xPBCH).

Referring to FIG. 13, analog beams belonging to different antenna panels within one symbol may be transmitted simultaneously. As shown in FIG. 13, to measure a channel for each analog beam, a method for introducing a beam RS (BRS), an RS transmitted with a single analog beam (corresponding to a specific antenna panel) being applied thereto, is under consideration. The BRS may be defined for a plurality of antenna ports, and each antenna port of the BRS may correspond to a single analog beam. At this time, unlike the BRS, a synchronization signal or xPBCH may be transmitted with all of the analog beams within an analog beam group being applied thereto to let an arbitrary UE duly receive the synchronization signal or the xPBCH.

RRM Measurement in the LTE

The LTE system supports an RRM operation for power control, scheduling, cell search, cell reselection, handover, radio link or connection monitoring, connection establishment/re-establishment, and the like. A serving cell may request, from a UE, RRM measurement information that contains a measurement value for performing an RRM operation. Typically, in the LTE system, a UE may measure/obtain information such as cell search information with respect to each cell, reference signal received power (RSRP), and reference signal received quality (RSRQ) and report the information. More specifically, in the LTE system, the UE receives, from the serving cell, 'measConfig' as a higher layer signal for RRM measurement. The UE may measure RSRP or RSRQ according to the information of the 'measConfig'. Here, definitions of RSRP, RSRQ, and RSSI according to the TS 36.214 document of the LTE system are as follows.

[RSRP]

Reference signal received power (RSRP) is defined as the linear average over the power contributions (in [W]) of the resource elements that carry cell-specific RSs (CRSs) within measurement frequency bandwidth in question. To determine RSRP, the CRS R0 according to TS 36.211 [3] shall be used. If the UE is able to reliably detect that R1 is available, the UE may use R1 in addition to R0 to determine RSRP.

The reference point for the RSRP has to be the antenna connector of a UE.

If the UE uses receiver diversity, a reported value should not be lower than the corresponding RSRP of any of individual diversity branches.

[RSRQ]

Reference signal received quality (RSRQ) is defined as the ratio N×RSRP/(E-UTRA carrier RSSI) (namely E-UTRA carrier RSSI to N×RSRP), where N represents the number of RBs of the E-UTRA carrier RSSI measurement bandwidth. The measurements of the numerator and denominator should be made over the same set of resource blocks.

The E-UTRA carrier received signal strength indicator (RSSI) may include a linear average of the total received power (in [W]) observed/measured by a UE only in OFDM symbols containing reference symbols for antenna port 0 over N resource blocks from all of the sources (including co-channel serving and non-serving cells) in the measurement bandwidth, channel interference, thermal noise, and so on. If higher layer signaling indicates certain subframes for performing RSRQ measurements, RSSI may be then measured over all OFDM symbols in the indicated subframes.

The reference point for the RSRQ has to be the antenna connector of a UE.

If the UE uses receiver diversity, a reported value should not be lower than the corresponding RSRQ of any of individual diversity branches.

[RSSI]

RSSI may correspond to received wideband power including thermal noise and signal noise generated in the receiver within the bandwidth defined by a receiver pulse shaping filter.

The reference point for measurement has to be the antenna connector of a UE.

If the UE uses receiver diversity, a reported value should not be lower than the corresponding UTRA carrier RSSI of any of individual receiver antenna branches.

According to the definition above, a UE operating in the LTE system may be allowed to measure RSRP within particular bandwidth corresponding to one of 6, 15, 25, 50, 75, and 100 resource blocks (RBs) through an information element (IE) related to allowed measurement bandwidth transmitted by system information block type 3 (SIB3) in the case of intra-frequency measurement and by system block type 5 (SIB5) in the case of inter-frequency measurement. In the absence of the IE, the UE may measure the RSRP in the frequency band of the whole DL system by default. At this time, if the UE receives allowed measurement bandwidth, the UE may regard the corresponding value as the maximum measurement bandwidth and measure the RSRP freely within the corresponding bandwidth/value. However, if the serving cell transmits an IE defined as wideband (WB)-RSRQ and configures allowed measurement bandwidth to be larger than 50 RBs, the UE has to calculate the RSRP over the whole allowed measurement bandwidth. Meanwhile, RSSI may be measured in the frequency bandwidth allowed for a receiver of the UE according to the definition of RSSI bandwidth.

FIG. 14 illustrates a panel antenna array to which the present disclosure may be applied.

Referring to FIG. 14, a panel antenna array comprises Mg and Ng panels in the horizontal and vertical domains respectively, where each panel comprises M columns and N rows.

In particular, the panel in the present figure illustrates a cross polarization (X-pol) antenna. Therefore, the total number of antennas of FIG. 17 may be 2*M*N*Mg*Ng.

CSI Feedback Contents

In the RAN1 #89 meeting, it was agreed on to adopt R1-1709232 for a DL codebook configuration method for the NR. The present document describes a single panel having normal resolution, which constitute DL CSI feedback type I, a codebook configuration method corresponding to a multi-panel, and a codebook configuration method based on type II linear combination. The present disclosure describes a method for configuring CSI feedback contents when CSI (for example, CSI-RS resource indicator (CRI), RI, PMI and/or CQI) is fed back by using the aforementioned codebook. However, it should be noted that the present disclosure is not limited to the specific description, but the CSI feedback contents proposed in the present specification may be applied for various types of codebook configurations.

The maximum number of ranks of the elements constituting CSI that may be reported is determined according to CRI (specific analog and/or digital beamforming is configured/applied for each (CSI-RS) resource) and RI (reception antenna ports ($N_{Rx}$ or antenna ports (which is called ports, hereinafter)) of a UE reported to an eNB as capability). In other words, the bit field of the RI may be determined according to a relationship RI≤$N_{Rx}$. For example, when $N_{Rx}$=2, the bit field of RI is configured to be 1 bit long for reporting; when $N_{Rx}$=4, 2 bits long; and when $N_{Rx}$=8, 3 bits long. Also, in the case of transmission and/or reception point (TRP) or inter-panel non-coherent joint transmission (JT), RI may be used for TRP or panel selection or for indication of unused TRP or panel. In the latter case, it may be reported that RI=0.

In the case of PMI, the UE may calculate the most preferred or best (or worst) companion PMI among PMIs calculated by using (or based on) a codebook represented by type I and type II and report the calculated companion PMI to the eNB. Depending on frequency granularity to be reported, the PMI may become (or may be expressed as) WB, subband (SB) and/or partial band (PB) PMI, or depending on the period at which the PMI is reported, the PMI may become (or may be expressed as) long-term or short-term PMI.

The CQI may be calculated by the UE based on a metric (for example, SINR) calculated from RS such as CSI-RS and a codebook and may be reported to the eNB by using a CQI table.

1. CRI

CRI may be used as a value representing a Tx beam index for the sole use of beam management (BM). In this case, the total number (M) of Tx beams may be determined (for example, M=$N_a O_a$) based on the number ($N_a$) of antenna elements participating in TXRU virtualization of an eNB and/or oversampling value ($O_a$) of an analog beam. These parameters may be indicated to the UE through higher layer signaling or agreed on with the eNB to have specific values. And/or the number of analog Tx beams may be configured for the UE by the eNB or agreed on with the UE in advance. In this case, the maximum size of CRI may be configured/applied for the UE as [$\log_2 M$]. The CRI for the use of BM may be reported to the eNB alone.

1-A. CRI+Beam Group Index (BGI)

BGI is an indicator for an RX analog beam group and may group/configure a Tx beam group corresponding to Tx beams (or spatially QCLed Tx beams) based on/with reference to an arbitrary metric (for example, RSRP, RSRQ and/or SINR) or according to each panel installed in a UE.

CRI and BGI may be reported after being encoded separately or reported after being encoded jointly to reduce overhead due to payload size.

1-A-i. CRI+BGI+RSRPI (or CQI)

This method corresponds to an embodiment that reports an RSRP indicator in addition to the combination of CRI+BGI to indicate information about RSRP corresponding to a Tx beam or a Tx-Rx beam pair. Each indicator may be reported after being encoded separately or reported after being encoded jointly to reduce overhead due to payload size. However, the present method exhibits a problem that a table for RSRP has to be defined separately. To solve the problem, RSRP may be reported by using a CQI table. In this case, a UE may calculate WB CQI by ignoring interference or calculate WB CQI by using a one-short measurement of the interference. At this time, the UE may assume a rank 1 restriction even if the number of ports configured for the use of BM is larger than 1. This assumption provides an advantage that fast CQI acquisition may be achieved. Therefore, an eNB may inform a UE, additionally through higher layer signaling, about whether to use RSRPI or to use CQI.

B. CRI+RSRPI (or CQI)

Similarly to how the method of 1-A-i operates, CRI and RSRPI (or CQI) may be reported together without BGI reporting.

C. CRI+PMI

If a plurality of ports are configured within CRI, and a separate analog beam is configured for each port, a UE has to also report information about ports within the CRI separately in order to report a preferred Tx beam to an eNB. In this case, PMI such as a port selection codebook may be applied for indication of a port, which may have characteristics of WB. Also, although CRI and PMI may be encoded separately, they may be jointly encoded to reduce payload size when a port such as 12-port or 24-port, the number of which is not a power of 2, is configured.

And/or in the methods above, A, B, and an extended combined report type (for example, CRI+PMI+RSRPI (or CQI)) may also be considered/derived. And/or if the number of ports used for BM is configured to be smaller than X-ports (for example, X=8, configurable), the additional CRI+PMI type may not be considered, but RI may be extended to be applied as an indicator of each port to be used for CRI+RI reporting.

The CRI above has been described mainly for the use of BM, and an embodiment has been described, where only one BM CSI set={CRI, BGI, RSRPI (or CQI), PMI} corresponding to the best preferred analog beam (set) is reported. An eNB may configure/apply a UE to report a plurality of analog beams for the purpose of Coordinated MultiPoint (CoMP) operation or (optimal or worst) interference control and/or beam recovery. At this time, the number of BM CSI sets (or BM CSI subsets) that has to be reported at the CSI resource setting, BM CSI reporting type (which is CSI comprising a BM CSI subset and corresponds to the A, B, and C methods) and/or BM CSI reporting mode may be configured/applied for each CSI process or in a comprehensive manner. In the case of PUCCH based reporting, after the number of BM CSI sets to be reported for the same instance of a resource setting according to a PUCCH container size may be configured, a plurality of configured BM CSI sets may be reported together (mode 1), or a plurality of configured BM CSI sets may be reported with the same period or with different offsets (mode 2). In this case, the best BM CSI set may have a higher priority than other BM CSI sets.

In the following embodiments, a periodic transmission mode for a plurality of BM CSI sets or BM CSI subsets is described. In what follows, for the convenience of descriptions, only the BM CSI set is described/indicated; however, it should be clearly understood that the BM CSI subsets may also be applied to the embodiments given below.

Mode 1)

First instance: BM CSI set_1+BM CSI set_2+BM CSI set_1_K (where K may be configured)

Mode 2)

First instance (offset 0): BM CSI set_1

First instance (offset 1): BM CSI set_2

. . .

First instance (offset K−1): BM CSI set_1_K (where K may be configured)

The CSI-based CSI reporting may be applied/used not only for BM but also for CSI acquisition process such as LTE class B. The CSI reporting may be configured for each CSI process at the time of CSI resource setting or may be informed to a UE through separate Radio Resource Control (RRC) signaling.

2. Type I PMI

FIGS. 15(a) and 15(b) illustrate an NR DL type I single panel codebook payload size according to one embodiment of the present disclosure. In particular, the present figure illustrates a payload size in the case of type I from the NR DL codebook included in the R1-1809232 document.

In the present figure, W1 mainly represents WB (and/or long-term), and W2 mainly represents SB (and/or short-term) PMI. Also, among x-ports, (1D) represents a case where a port layout of an eNB is 1D, namely N2=1(where N1 and N2 represent the numbers of ports in the first and the second domains, respectively). Config1 is the same as the Config1 of the LTE class A codebook, and Config2 is the same as the Config2 of the LTE class A codebook in the case of 2D and the same as the Config4 of the LTE class A codebook in the case of 1D. For the case where rank is greater than 3, only Config1 exists.

FIGS. 16(a) and 16(b) illustrate an NR DL type I multi-panel codebook payload size according to one embodiment of the present disclosure. In particular, the present figure illustrates/configures the codebook payload size in a multi-panel scenario.

In the present figure, Ng represents the number of panels; N1 and N2 represent the numbers of antenna ports in the first and the second domains within a single panel constituting a multi-panel, respectively; and a cross-polarization (X-pol) antenna is assumed. Therefore, 2*Ng*N1*N2 becomes the final number of ports. Also, in the case of a multi-panel, only up to rank 4 may be defined.

In the case of type I CSI described above, since payload of PMI is smaller than that of the type II CSI, PMI may be configured/applied not only for a PUSCH but also for PUCCH-based reporting in the same way as in the LTE.

In what follows, an embodiment for feedback contents encoding with respect to specific type I PMI will be proposed in detail.

Proposal 1—If a UE reports a codebook config, a codebook config indicator (1 bit CCI) may be encoded alone or encoded jointly with RI.

A difference between the codebook config 1 and 2 may be described by whether the number of beam groups comprising W1 is 1 or 4, which results in whether beam selection is included at the time of SB PMI configuration. Therefore, in the case of a channel condition where frequency selectivity is very important due to large delay spread, if a UE is configured with Config 1, the frequency selectivity is not sufficiently reflected through a codebook. In this case, it is advantageous to perform reporting (namely codebook Config 2) including beam selection in the W2. Therefore, a UE may adjust PMI more adaptively by additionally reporting which codebook config to use via the CCI according to the channel condition. Although the 1-bit CCI (for example, distinction/indication of whether to use Config 1 or 2) may be regarded as a kind of PMI, since the payload of PMI is changed according to the codebook config, CCI may be encoded alone or encoded jointly with RI. The CCI may be applied/configured for a PUCCH and/or PUSCH.

Proposal 2—If a UE is configured with a multi-panel codebook, an indicator (PCMI: 1 bit) for a panel co-phase mode may be encoded alone or encoded jointly with RI.

In the MP codebook, PMI for panel co-phase may be configured as mode 1 (WB co-phase) or mode 2 (WB+SB co-phase). In particular, if Ng=2 where mode 2 may be configured, a UE follows mode 1 when frequency selectivity is weak depending on a channel condition, and when an SB panel co-phase reporting is needed, PCMI may be encoded alone or encoded jointly with RI to let the UE use the MP codebook with respect to mode 2. This scheme is effective in saving payload and may be configured/applied to a PUCCH and/or a PUSCH. If two modes may be configured for different values of Ng, a UE may report the PCMI in the same way as described above; otherwise, the UE operates in the mode 1 by default and does not report PCMI.

Proposal 3—PUCCH Reporting Mode(s)

In NR, PMI feedback is expected to be designed to avoid codebook subsampling that may cause serious performance degradation even if PUCCH reporting is configured. In the case of a single panel codebook, since the maximum payload size uses RI=3, W1=8, W2=1, CQI=7 (since ranks 1 to 4 use one codeword (4 bits), and ranks 5 to 8 use two codewords (3 bits), 4+3=7 bits) for the case of a 32-port 2D layout, a total of 19 bits of payload is needed for WB PMI report, and even if SB reporting is taken into account, payload may be calculated as L (for example, 2 bits) or 19+L. Therefore, by taking into account the container size at which RI+PMI+CQI is reported at the same time, the following modes may be considered. In the following modes, to reinforce protection of RI, RI may be encoded at the most significant bit (MSB) position.

Mode 1-0) WB Report Mode
The first instance: RI+WB W1+WB W2+WB CQI, or
Mode 1-1)
The first instance: RI
The second instance: WB W1+WB W2+WB CQI The mode 1-1 is intended to reinforce protection of RI, and the first reporting instance (or period) may be configured to be an integer multiple of the second reporting instance (or period).

Mode 2-0) SB report mode
The first instance: RI+SB W1+SB W2+SB CQI+L, or
Mode 2-1)
The first instance: RI+WB W1+WB W2+WB CQI
The second instance: RI+WB W1+SB W2+SB CQI+L
or
Mode 2-2)
The first instance: RI
The second instance: WB W1+SB W2+SB CQI+L
Mode 2-3)
The first instance: RI+WB W1
The second instance: SB W2+SB CQI+L In the mode 2-1, 2-2, and 2-3, the first reporting instance (or period) may be configured to be an integer multiple of the second reporting instance (or period).

A UE may determine a precoding type in which to perform transmission among the mode 1-0) and 2-0) according to a channel condition and request transmission from an eNB, to this purpose, an additional 1-bit reporting may be considered, which may be encoded jointly with RI. For example, the following reporting forms may be considered, and PTI, as a precoding type indicator, may be used to perform the role similar to PTI in the LTE system.

The first instance: (RI+PTI=0)+WB W1+WB W2+WB CQI
The first instance: (RI+PTI=1)+SB W1+SB W2+SB CQI+L
Mode 3) SB report mode
The first instance: RI+WB W1 and/or (WB W2+WB CQI)
The second instance: (SB W2+SB CQI)_1+(SB W2+SB CQI)_2+ ... +(SB W2+SB CQI)_K
Or
Mode 3-1)
The first instance: RI+WB W1+WB W2+WB CQI+(SB W2+SB CQI)_1+(SB W2+SB CQI)_2++(SB W2+SB CQI)_NSB In the mode 3-1, SB CQI is configured to indicate a differential value of WB CQI and may be assigned a bit width smaller than that of WB CQI or a bit width the same as that of WB CQI. NSB represents the number of configured SBs.

In the modes described above, the first reporting instance (or period) may be configured/assumed to be an integer multiple of the second reporting instance (or period). At the second reporting instance, differently from the LTE, a UE may report PMI+CQI corresponding to K SBs (where K is configurable). In particular, to reduce a payload for CQI feedback, the corresponding mode may be limited to be configured only for a UE for which the maximum RI is smaller than 4, or an eNB may additionally provide the UE with signaling for the maximum RI report to implicitly indicate operation of the mode 3. Or, if the eNB explicitly indicates the mode 3, the UE may be configured/operated by using the codebook subset restriction so that the UE operates with RI of up to 4 even though the UE may have reported its capability information as having the maximum RI of 8.

The RI restriction signaling may be used for the purpose of system load balancing. Or to reduce the payload of CQI, a UE may perform reporting in such a way that more bits are allocated to CQI_1, and less bits (for example, an index for a difference from CQI_1) are allocated to CQI_2, CQI_K. Also, in the case of mode 3, the payload of W2 may also be reduced by restricting the mode 3 to codebook config 1.

The proposal 3 may be extended to be applied as a combination of the proposal 1 and 2. Also, the proposal 1, 2 and/or 3 may all be applied to PUCCH reporting of type I CSI feedback including a single panel (SP) and multi-panel (MP). Mode 1, 2 and/or 3 may be configured through higher layer signaling or may be recommended by the UE for the eNB by taking into account channel conditions.

At the time of PUCCH reporting as in the proposals above, since the maximum payload size is varied according to the number of ports configured for a UE and/or whether a panel configuration is SP or MP, a supported PUCCH container or format may also be configured differently.

In the case of PUCCH-based one instance reporting, feedback payload may be saved if joint encoding such as RI+PMI (W1, W2)+CQI (or RI/PMI+CQI) is performed. In other words, if PMI size varies according to the RI (CQI size is varied, for example, CQI size of ranks 1 to 4 which have 1 CW is different from CQI size of ranks 5 to 8 which have 2 CWs), the fact that the PUCCH only reporting is a block code series (for example, polar or low-density parity-check (LDPC) code) may be utilized. The process may be performed in an order that RI is decoded first, after which PMI is decoded by reflecting the decoding result. For example, it may be assumed that PMI=10 bits when RI=1 and PMI=12 bits when RI=2. In this case, an eNB may decode the RI first, and if it has been decoded that RI=1, information corresponding to PMI of 10 bits may be decoded. This is based on the fact that the length of a block using a block code does not change according to information (message) length.

Therefore, in the present specification, to reduce the payload in the PUCCCH only reporting, it is proposed to perform joint encoding of RI, PMI and/or CQI. In particular, in the case of mode 3-1 in which all of CSI contents are transmitted at the first instance, payload may be reduced as RI, PMI and/or CQI are jointly encoded/reported according to the principles described above. When this mode is supported, the payload of SB may become the largest problem. To solve this problem, the mode may be restricted to mode 1 in the case of codebook Config 1 or MP (for both of the cases, W2 is 2 when rank is 1, and for other cases, W2 is 1). And/or the rank may be restricted so that it is always configured to be smaller than 4 (since one CW is used, this is intended to adjust SB CQI payload).

3. Type II PMI

In the case of type II, the payload size is very big compared with that of type I PMI. Therefore, type II is not suitable for PUCCH-based reporting that imposes a considerable restriction on the payload size and may be agreed on/restricted to be operated according to PUSCH-only reporting. If PUCCH-based reporting is used, similarly to how LTE advanced CSI is used, it may be configured/applied so that WB CSI reporting that assumes L=2, QPSK co-phase and/or rank 1 restriction may be performed.

Elements of the type II PMI include O1*O2 orthogonal set selections for comprising W1 (where O1 and O2 correspond to oversampling factors of the first and second domains, respectively), selection of L beams that are linearly combined among N1*N2 given orthogonal beams $$\binom{N_1 N_2}{L},$$

selection of the strongest beam among a total of 2L beams by taking account of X-pol antennas, and WB amplitude combining; and W2 may comprise SB phase and/or amplitude combining of 2L beams.

Proposal 4—In the case of PUSCH reporting, encoding and reporting of RI, W1, W2+CQI and/or CRI are performed individually.

In the case of type II CSI feedback, the value of WB amplitude coefficient contains 0. In this case, a payload corresponding to SB phase and/or amplitude combining is wasted. To solve this problem, a case of encoding WB amplitude alone and a case of jointly encoding the WB amplitude with RI may be considered. However, the payload size of the WB power coefficient is calculated as 3 bit*(2L−1), and even when L=2, and rank is 1, the payload size becomes very large, amounting to 9 bits. If rank is 2, the payload size becomes 18 bits, and thus, there may arise a problem that protection performance of RI is weakened to be jointly encoded with RI (3 bits).

Therefore, the present specification proposes that RI and PMI corresponding to W1 including the WB power coefficient are encoded separately, and PMI and CQI corresponding to W2 are jointly encoded. The CSI priority that takes into account protection may be determined such that CRI>RI>W1>W2+CQI. The present proposal may be applied only to the configuration according to type II CSI. In the case of type I, like the conventional LTE, encoding may be performed to RI and PMI+CQI separately. Or, the proposal 4 may be applied collectively to both of the type I and II.

If RI is jointly encoded with W1, CRI and RI may have to be encoded at the MSB position for the purpose of protection. Or to prevent p from being selected as p=0 or to minimize p, a UE may request the eNB to reduce the value of L, report PMI calculated by reducing the value of L, or report information/indication to the eNB that the value of L has been changed.

In the case of PUCCH reporting (for example, type I, type II (for example, WB mode)), the maximum payload size is varied (in particular, because the size of PMI that a UE has to report according to rank/RI is changed greatly) according to the number of ports configured for the UE, whether the panel configuration is SP or MP and/or rank (or RI) reported by the UE, PUCCH container (namely PUCCH-based CSI report/contents) size and/or format may be configured differently according to all of the factors or a subset thereof. The PUCCH container size and/or format may be recommended by the UE for the eNB or configured/indicated for the UE by the eNB.

Proposal A—When a UE performs CSI reporting, a payload size (or format) indicator may be additionally fed back at PUCCH and/or PUSCH.

As described above, NR may support various types of codebooks and a variable number of ports. The codebook size may be varied according to the type of codebook, the number of ports and/or the rank number. To perform effective encoding according to the payload size, the present disclosure proposes to provide a payload size (or PUCCH and/or PUSCH format) indicator additionally as feedback information. In the case of the existing LTE PUCCH, a container size has been determined (for example, W2=4 bits) independently of an actual rank but based on the rank exhibiting the largest PMI among the entire ranks. If a payload size indicator is additionally fed back according to the present proposal, an advantageous effect is obtained that restriction due to the payload size (for example, unavoidable subsampling) is relieved, or waste of payload is reduced.

When the present proposal is applied/used, each CSI (for example, CRI, RI, PMI and/or CQI) may be encoded individually. Or to reduce the overhead as much as possible, the CSI that has to be transmitted at a transmission time may be transmitted after all of the CSI is jointly encoded.

If granularity of the payload size (or format) indicator does not cover all the possible cases of ranks and transmission modes (WB or SB), the operation of a UE may be defined as follows. The payload size indicator of the UE may be reported to the eNB as a payload size index corresponding to an integer that is the smallest integer but still larger than N-bit payload calculated at the time of transmission. In the case of PUCCH, it may be transmitted after the UE performs UL power control due to the size of the indicator proposed above. For example, if a 1-bit indicator (20 bit, 30-bit indicator) is configured, and the total payload is 15 bits, the UE may perform reporting of 15 bit-CSI in a container corresponding to 20 bits and perform PUCCH control with reference to 20-bit basis.

The information (for example, size of an indicator or element value) of the payload size (or format) indicator may be configured for the UE through higher layer signaling such as RRC or Media Access Control (MAC) Control Element (CE) by the eNB.

The payload size (or format) indicator described above has a higher priority than CSI and particularly, may be encoded to a position close to DMRS at which protection is better provided at the time of PUSCH encoding.

Also, if a plurality of CSI-RSs are configured, it is necessary that CRI is also fed back along with other CSI contents/constituting elements. In this case, the total payload size may be varied according to CRI, RI, or Relative Power Indicator (RPI). To simplify determination of the total payload size or feedback container size, a payload indicator (PI) may be introduced. Table 5 illustrates a payload calculation for a 32-port CSI-RS based on the type I codebook. In the present table, it is assumed that codebook config 2 is used, and the number of SBs is 10. In general, the total amount of payload may be calculated as the maximum value of CSI contents/constituting elements. Therefore, the container size may be calculated as 3 (RI)+9 (WI)+4 (W2)+7 (CQI)=59 bits.

TABLE 5

| Rank | W1 | W2 | CQI | Total payload (bits, 10 SBs) |
|---|---|---|---|---|
| 1 | 6 | 4 | 4 | 53 |
| 2 | 8 | 3 | 4 | 45 |
| 3 | 9 | 1 | 4 | 26 |
| 4 | 9 | 1 | 4 | 26 |
| 5 | 8 | 1 | 7 | 28 |
| 6 | 8 | 1 | 7 | 25 |
| 7 | 8 | 1 | 7 | 25 |
| 8 | 8 | 1 | 7 | 28 |

The total container size using PI may be represented as shown in Table 6. As shown in Table 6, if PI is used, the payload size for reporting may be effectively reduced.

TABLE 6

| Payload indicator index | RI | W1 | W2 | CQI | Total payload (bits, 10 SBs) |
|---|---|---|---|---|---|
| 0 | 0 | 6 | 4 | 4 | 50 |
| 1 | 0 | 8 | 3 | 4 | 42 |
| 2 | 1 | 9 | 1 | 4 | 24 |
|   |   | 9 | 1 | 4 | 24 |
| 3 | 2 | 8 | 1 | 7 | 27 |
|   |   | 8 | 1 | 7 | 27 |
|   |   | 8 | 1 | 7 | 27 |
|   |   | 8 | 1 | 7 | 27 |

Therefore, the present specification proposes to introduce a payload size indicator to simplify determination of the total payload size and to reduce the amount of overhead.

4. CQI

The conventional LTE TS 36.213 specification defines three 4-bit CQI tables for CQI reporting. Each table is configured for a UE in consideration of UE or eNB capability. In NR, too, these tables may be switched to be used as a CQI table, and a new table for supporting Binary Phase Shift Keying (BPSK) in a UE based on 1024 QAM or NB-IoT may be added to the existing three tables so that the UE calculates the CQI index from an operation such as CQI table switching. To simplify the operation of table switching, the present specification proposes the following embodiments. In what follows, the proposed embodiments may be applied/used effectively for URLLC, in particular.

Proposal 5—5-Bit CQI Table Configuration

Table 7 shows a 5-bit CQI table configuration example. The present table is an example in which union of the three tables of the existing LTE and indexes of 1024 Quadrature Amplitude Modulation (QAM) are additionally provided. Also, BPSK may be additionally applied to the reserved state.

TABLE 7

| CQI index | modulation | Code rate × 1024 | Efficiency |
|---|---|---|---|
| 0 | | out of range | |
| 1 | QPSK | 40 | 0.0781 |
| 2 | QPSK | 78 | 0.1523 |
| 3 | QPSK | 120 | 0.2344 |
| 4 | QPSK | 193 | 0.377 |
| 5 | QPSK | 308 | 0.6016 |
| 6 | QPSK | 449 | 0.877 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | 64QAM | 466 | 2.7305 |
| 12 | 64QAM | 567 | 3.3223 |
| 13 | 64QAM | 666 | 3.9023 |
| 14 | 64QAM | 772 | 4.5234 |
| 15 | 64QAM | 873 | 5.1152 |
| 16 | 256QAM | 711 | 5.5547 |
| 17 | 256QAM | 797 | 6.2266 |
| 18 | 256QAM | 885 | 6.9141 |
| 19 | 256QAM | 948 | 7.4063 |
| 20 | 1024QAM | TBD | TBD |
| 21 | 1024QAM | TBD | TBD |
| 22 | 1024QAM | TBD | TBD |
| 23 | 1024QAM | TBD | TBD |
| 24 | 1024QAM | TBD | TBD |
| 25 | 1024QAM | TBD | TBD |
| 26 | | | |
| 27 | | | |
| 28 | | | |
| 29 | | | |
| 30 | | | |
| 31 | | | |

In using the 5-bit CQI table as shown in Table 7, there is a disadvantage that 1 bit is always wasted for CQI reporting since the 5-bit table is still used even though a 4-bit table is more than enough if the UE capability is 16QAM. Therefore, an eNB may signal the maximum modulation level used in the 5-bit table to the UE via higher layer signaling. Then the UE may calculate the payload including an index up to the configured modulation level and determine the payload size of CQI according to the number of bits calculated. For example, the UE may perform feedback based on 3-bit CQI payload if the maximum modulation level is Quadrature Phase Shift Keying (QPSK), 4 bit CQI payload in the case of 64 QAM, and 5 bit CQI payload in the case of 1024 QAM, thereby determining/using the CQI payload adaptively.

Proposal 6—Construction of Configurable Q-Bit CQI Table

In the present proposal, an eNB may determine the maximum modulation level by taking into account the eNB capability and/or UE capability and at the same time, may construct a CQI table by additionally signaling the payload of CQI to the higher layer.

For example, if the maximum modulation level is 64 QAM, and Q=5 bits, the CQI table may be constructed as a 5-bit table providing 32 states. To this purpose, the step size of signal-to-noise ratio (SNR) used for constructing a CQI table or maximum and/or minimum SNR range may be adjusted. As one example, the 5-bit CQI table may be used by extending the value (for example, 1.9 dB) of SNR step size used for constructing Table 8 defined in the LTE as shown below to be configured as half the value (for example, 0.95 dB). In other words, the present embodiment provides the same effect that the 2:1 mapping relationship between the existing LTE Modulation Coding Scheme (MCS) table (TS 36.213 Table 7.1.7.1) and CQI table is extended to 1:1 mapping relationship.

TABLE 8

| CQI index | modulation | code rate × 1024 | efficiency |
| --- | --- | --- | --- |
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Proposal 7—CQI Table Switching Between (Q1, Q2)-Bit CQI Table

According to the present proposal, after configuring, for example, a 4-bit and 5-bit CQI tables based on the maximum modulation level, an eNB may configure the CQI tables depending on channel conditions or use cases. For example, if the CSI-RS density is configured to exceed 1 RE/RB/port for the purpose of type II CSI reporting for which channel accuracy is important or for accurate measurement of a channel, a Q1 (Q1>Q2)-bit CQI table that provides higher bit resolution may be used. Or if a target Block Error Rate (BLER) is low as in the URLLC, accuracy of CQI is more important than others, and therefore, a CQI table corresponding to higher bit resolution (or with a larger bit size) may be used.

The examples described in the present proposal may also be applied to the proposal 6, and in this case, a CQI table may be constructed by configuring a higher Q value. The (Q1, Q2)-bit CQI table pair described above allows configuration of a plurality of table pairs according to the maximum modulation level similarly to the scheme used in the LTE.

Proposal 8—Master CQI Table

The present proposal is a CQI table configuration/indication method that defines a very large sized CQI table (for example, 7 bits) in the most flexible manner and configures a UE with the minimum CQI (for example, CQI index 1) and the maximum CQI index and/or CQI (index) step size (or interval). The number of bits of a CQI table configured for a UE according to the proposed method may be determined as Q=ceiling[log_2 ((CQI_max—CQI_min)/CQI_step-size)+1], where 1 indicates that the CQI index 0 is always determined as out of range. The Q value may be configured independently for each UE (for example, a different value for each UE). At this time, the step size may use a different value for each modulation.

The method for configuring a CQI table as described above may be indicated to a UE via RRC and/or MAC CE. In other words, information about a default table may be indicated/signaled to a UE via RRC or predefined between an eNB and the UE, or the eNB may configure the information via MAC CE in consideration of the UE's environment. According to the present method, more accurate CQI reporting may be performed, and CQI payload size may be saved.

And/or, by signaling, to a UE, only the maximum/minimum modulation order/index used in a CQI master table to be configured/applied, a (new) CQI table may be constructed, which uses/includes all of CQI indexes belonging to a range from the minimum modulation order/index to the maximum modulation order/index in the corresponding master table.

When the master table is used, in addition to a method for (newly) constructing a CQI table to be configured/applied by using the minimum CQI, maximum CQI and/or step size, an eNB may construct the CQI table by explicitly indicating (for example, indicating by using a bitmap) indexes to be used as signaling of RRC or MAC CE in the master table in a UE-specific manner. In this construction method, too, the "0" state may be predefined to represent "out of range".

When the proposed master CQI table is used, at least one state may be fixed to the highest code rate value and the configured/applied maximum modulation value to report a peak data rate of the maximum modulation order/index to be configured/applied.

Proposal 9—which CQI Table (for Example, According to the Maximum Modulation Level or Bit Size) to Use May be Designated/Indicated in the CSI Reporting Setting In NR, information about contents used for CSI reporting may be configured in the CSI reporting setting. Therefore, in the existence of a plurality of CQI tables (for example, among CQI tables constructed according to the maximum modulation level and/or bit size), which CQI table to use may be designated/indicated for each CSI process in the CSI reporting setting. If the proposal 5 is used, once the maximum modulation level is configured for each process, the UE may configure/apply a CQI table suitable/relevant to the configured maximum modulation level.

In the same way as described above, a differential CQI table (which is constructed as a 2-bit table in the case of LTE) of SB CQI that reports a difference from WB CQI may also be configured similarly to the proposal 5, 6, 7, and 8, and the eNB may perform configuration adaptively according to the environment of the UE.

The differential CQI has been used in the LTE to more efficiently report CQI corresponding to the MCS level applied two CWs. In other words, a UE reports one CW by using a 4-bit table, and reports the other CW in terms of a 3-bit differential CQI with respect to the one CW. In NR, it was agreed on to use one CW for ranks 1 to 4 and two CWs for the rank of 5 or more. Therefore, the use of a differential CQI is restricted to the case when the UE reports the rank to be larger than 5, which does not provide a significant effect of payload size reduction for using the differential CQI. Therefore, to prevent performance degradation due to CQI mismatch from the differential CQI reporting, the present disclosure proposes CQI reporting that uses the same CQI table (the same payload size) for each codeword instead of using differential CQI reporting.

Proposal 9-1—In the case of a UE configured with a table supporting high modulation because of the UE's high capability (for example, 1024 capable UE) or if geometry of a UE deteriorates rapidly due to mobility or blockage and thus the UE is unable to support high MCS, the UE may request an eNB to change the CQI table. Here, the CQI table may include/indicate the proposed CQI table.

Proposal 9-2—In another method, when there are several CQI tables that may be supported within UE capability, a UE may report, to an eNB, an index of a CQI table that may be used for a long period of time (for example, it may be a long term compared to the WB CSI reporting).

5. Mcs

An eNB may indicate, to a UE, MCS (for example, 5 bits) having/indicating information such as modulation and coding rate based on the CQI reported by the UE through signaling such as DCI. Tables 9 and 10 show modulation and Transport block size (TBS) index tables for PDSCH. In the case of Table 9 and/or 10, when the UE uses only the Licensed Assisted Access (LAA)-based 2nd slot in the LTE, a modulation order of Q' may be used to satisfy the code rate.

TABLE 9

| MCS Index $I_{MCS}$ | Modulation Order $Q_m$ | Modulation Order $Q'_m$ | TBS Index $I_{TBS}$ |
|---|---|---|---|
| 0 | 2 | 2 | 0 |
| 1 | 2 | 2 | 1 |
| 2 | 2 | 2 | 2 |
| 3 | 2 | 2 | 3 |
| 4 | 2 | 2 | 4 |
| 5 | 2 | 4 | 5 |
| 6 | 2 | 4 | 6 |
| 7 | 2 | 4 | 7 |
| 8 | 2 | 4 | 8 |
| 9 | 2 | 4 | 9 |
| 10 | 4 | 6 | 9 |
| 11 | 4 | 6 | 10 |
| 12 | 4 | 6 | 11 |
| 13 | 4 | 6 | 12 |
| 14 | 4 | 6 | 13 |
| 15 | 4 | 6 | 14 |
| 16 | 4 | 6 | 15 |
| 17 | 6 | 6 | 15 |
| 18 | 6 | 6 | 16 |
| 19 | 6 | 6 | 17 |
| 20 | 6 | 6 | 18 |
| 21 | 6 | 6 | 19 |
| 22 | 6 | 6 | 20 |
| 23 | 6 | 6 | 21 |
| 24 | 6 | 6 | 22 |
| 25 | 6 | 6 | 23 |
| 26 | 6 | 6 | 24 |
| 27 | 6 | 6 | 25 |
| 28 | 6 | 6 | 26/26A |
| 29 | 2 | 2 | reserved |
| 30 | 4 | 4 | |
| 31 | 6 | 6 | |

TABLE 10

| MCS Index $I_{MCS}$ | Modulation Order $Q_m$ | Modulation Order $Q'_m$ | TBS Index $I_{TBS}$ |
|---|---|---|---|
| 0 | 2 | 2 | 0 |
| 1 | 2 | 2 | 2 |
| 2 | 2 | 2 | 4 |
| 3 | 2 | 4 | 6 |
| 4 | 2 | 4 | 8 |
| 5 | 4 | 6 | 10 |
| 6 | 4 | 6 | 11 |
| 7 | 4 | 6 | 12 |
| 8 | 4 | 6 | 13 |
| 9 | 4 | 6 | 14 |
| 10 | 4 | 8 | 15 |
| 11 | 6 | 8 | 16 |
| 12 | 6 | 8 | 17 |
| 13 | 6 | 8 | 18 |
| 14 | 6 | 8 | 19 |
| 15 | 6 | 8 | 20 |
| 16 | 6 | 8 | 21 |
| 17 | 6 | 8 | 22 |
| 18 | 6 | 8 | 23 |
| 19 | 6 | 8 | 24 |
| 20 | 8 | 8 | 25 |
| 21 | 8 | 8 | 27 |
| 22 | 8 | 8 | 28 |
| 23 | 8 | 8 | 29 |
| 24 | 8 | 8 | 30 |
| 25 | 8 | 8 | 31 |
| 26 | 8 | 8 | 32 |
| 27 | 8 | 8 | 33/33A |
| 28 | 2 | 2 | reserved |
| 29 | 4 | 4 | |
| 30 | 6 | 6 | |
| 31 | 8 | 8 | |

The reserved state in Tables 9 and 10 may be indicated for the purpose of modifying a modulation level when retransmission occurs according as a UE feeds back NACK. A TBS index corresponding to the indicated modulation level may follow the TBS index of DCI with respect to the most recent PDCCH/enhanced PDCCH (EPDCCH).

The MCS table may also be configured similarly to the method for configuring the proposed CQI table.

Proposal 10-5-Bit MCS Table Up to 1024 QAM

Since NR supports a 1024 QAM UE, an MCS table (which table to newly use may be configured via a higher layer such as RRC) for the support may be configured/defined. For example, in Table 10, Q=10 and a TBS index corresponding thereto may be mapped by using the 1024 QAM (Q=10) without using the reserved states (28~31) or subsampling that employs other modulation order, for example, only part (for example, 20~25) of 20 to 27 indexes corresponding to 256 QAM may be performed, and the remaining states may be mapped to the indexes associated with the 1024 QAM. If no reserved state is provided as in the present proposal, the latest TBS index is used for retransmission, and no reserved state used to change the modulation order is involved.

Proposal 10-1—Reserved State

If a modulation order is attempted to be changed at the time of retransmission, two states may be defined as reserved, denoted by "−" and/or "+" state. Here, "−" state indicates lowering a modulation level of the initial transmission (or previous transmission) by one step (for example, modulation order −2), and "+" state indicates increasing the modulation level of the initial transmission by one step (for example, modulation order +2). If the modulation order is 2, the UE does not expect the "−" state to be indicated. If the modulation order is 10 or corresponds to the maximum modulation order, a UE does not expect the "+" state to be indicated. In addition, when "0" state is considered, it indicates that the modulation order is not changed at the time of retransmission, which may be used to inform the UE of the retransmission.

If the proposed reserved state is not included in the MCS table, the state may be indicated by a differential modulation order field of separate M-bits (for example, M=2, +2, 0, −2).

Proposal 11—Master MCS Table Configuration

If a big MCS table (for example, 6 bits are used for Q=[2, 4, 6, 8, 10] and TBS_index) capable of supporting both of QPSK and 1024 QAM is configured/defined, an eNB may configure a UE with the maximum MCS index (MCS_max), minimum MCS index (MCS_min) and/or step_size (or step_size related to TBS_index) through separate higher layer signaling (for example, RRC or MAC CE) to construct a W-bit MCS table. At this time, W may be defined as ceiling[log_2 ((MCS_max−MCS_min)/step_size).

For the purpose of further subdividing the modulation corresponding to an SNR range related to the geometry of a UE and configuring the UE with the subdivided modulation, a modulation level may be configured by a step size for each modulation or modulation group. In this case, W may be defined as Eq. 14 below.

$$W = \left\lceil \log_2\left(\sum_i (MCS_{max\_i} - MCS_{min\_i})/stepsize_i\right)\right\rceil \quad \text{[Eq. 14]}$$

Here, i may be configured to be 2, 4, 6, 8, 10 or a subset of the values and may be denoted/indicated by an index corresponding to each modulation. In this case, one or more parameters may be configured by their default value.

And/or a W-bit MCS table may be constructed according as only W is indicated to a UE (namely, a bit width is indicated to the UE), and the whole or part (for example, MCS_max, MCS_min, or stepsize) of the remaining parameters are determined by predefined default values or configured via RRC. To secure flexibility, W value may be configured/applied/indicated independently for each UE.

When the master table is constructed, TBS sizes, which correspond to part of MCS indexes for solving an overlapping problem between adjacent modulation orders and for achieving a code rate (for example, 0.930 of the LTE) to support the maximum peak rate, may be fixed according to the maximum supported MCS order considering UE capability. Also, specific indexes may be configured to support more than a specific code rate (for example, 2/3). To this purpose, part of indexes located at the modulation order boundary may be configured to have two TBS index values, where one is to be used as a value for covering a predetermined SNR range, and the other one is to be used for satisfying a specific code rate. The value for achieving a specific code rate may be used being tied to specific UE capability or configured maximum MCS order. In other words, if the maximum modulation order is 256 QAM, indexes in the latter part (for example, N indexes starting from the last index in the decreasing order) of the MCS indexes corresponding to the 256 QAM may be mapped to TBS indexes satisfying a specific code rate, and the remaining indexes except for those in the latter part may be mapped to TBS indexes predefined or configured for the purpose of covering a predetermined SNR range. And/or the TBS value of some MCS indexes having two values may be configured through the higher layer (for example, RRC or MAC CE).

And/or, a specific state may be predefined to include the maximum modulation order and the maximum code rate (for example, 0.930) configured/applied to support a peak rate that is always achievable. In addition to this, the reserved state for retransmission described above may also be predefined to be included in the corresponding specific state. For example, if a modulation order Q corresponding to the configured maximum MCS index and minimum MCS index includes 4 and 6, the modulation order of the reserved state in which a TBS index is not included may be agreed on to always include 4 and 6 or to include the 2-state differential modulation order.

If a master table is used according to or based on the method described above, in addition to the method for constructing an MCS table to be configured/applied by using values such as the minimum MCS, maximum MCS and/or step size, the MCS table may also be constructed by explicitly indicating (for example, indicating by using a bitmap) indexes to be used in the master table through signaling such as RRC or MAC CE in a UE-specific manner.

And/or, by signaling only the maximum/minimum modulation order used in an MCS table to be configured/applied, the MCS table may also be constructed by configuring/applying the MCS indexes so that all of the MCS indexes belonging to the range from the minimum modulation order to the maximum modulation order of the master table are used.

Proposal 12—Uplink MCS Table Configuration Method

In the case of UL, NR may support two waveforms of Discrete Fourier transform spread OFDM (DFT-s-OFDM) and Cyclic Prefix Orthogonal Frequency Division Multiplexing (CP-OFDM), and modulation order supported for each waveform is defined as follows.

NR UL CP OFDM: QPSK ~256 QAM with higher ranks
NR UL DFT-s-OFDM: pi/2-BPSK ~256 QAM with a single rank In other words, only for UL transmission, an MCS table may be interpreted differently according to UE capability.

Table 11 below shows TBS indexes for PUSCH and redundancy versions.

TABLE 11

| MCS Index $I_{MCS}$ | Modulation Order $Q'_m$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

Considering the MCS table method based on the proposals, an MCS table used for UL transmission may be configured as follows.

Proposal 12-1—W-Bit MCS Table Configuration Method

The MCS table may be configured differently according to each waveform, which may be tied to a configured/ applied waveform. In the case of CP-OFDM, since the same waveform as in DL transmission is used and an MCS order may be employed, the same table may be applied commonly. On the other hand, in the case of DFT-s-OFDM, a table in which BPSK modulation is added to an LTE MCS table as shown in Table 11 may be used (for example, a reserved state corresponding to the redundancy version is deleted, and a modulation level corresponding to BPSK is added to replace the deleted state; a specific modulation order is subsampled, and a modulation order corresponding to BPSK is added to the remaining states; or a modulation order corresponding to BPSK may be added in the form of a combination of the two methods). In the case of DFT-s-OFDM, since it is likely to be used for the purpose of fallback, and a low modulation order may be used with a high probability, MCS indexes corresponding to BPSK and/or QPSK occupy a relatively large number of states when a table is configured, and the remaining 16, 64 and/or 256 QAM may occupy a relatively small number of states. Also, in the case of DFT-s-OFDM, configuration may be performed with a relatively small bit-width (V-bit (V<=W) compared with CP-OFDM, or a limited set of TBS indexes may be used.

In the case of NR, since UL may be transmitted asynchronously, the redundancy version has to be transmitted via a separate field as in the DL transmission. In other words, MCS and redundancy version (RV) may be encoded separately rather than encoded jointly, and the state occupied by RV may be used for changing the modulation order as a reserved state at the time of retransmission as in the DL transmission or used for increasing resolution of each modulation order by using the remaining reserved states. This case, too, may be configured/applied differently depending on a waveform (namely, according to each waveform).

Proposal 12-2—Master MCS Table Configuration Method

The method above may be configured/applied similarly to the method of proposal 11; however, depending on a waveform, each configuration parameter may be configured/applied differently. Or in the case of DFT-s-OFDM, it may be configured/applied as a default table of specific V-bits. In the case of CP-OFDM, it may be configured/applied by using a master MCS table.

Proposal 13—Differential MCS Table for Two CWs

In the case of DCI, it is very important to consider saving overhead since DCI is signaled dynamically compared with other signaling. In the LTE, a CW has been supported for rank 2 or more, and 5-bit MCS/NDI/RV has been signaled independently for each CW. The bit width of MCS is large, which is 5-bit in the LTE, and as described above, systems that support a very high modulation order (for example, 1024 QAM), such as NR, may consider an even larger MCS bit width. Therefore, the present proposal proposes that one CW has a bit width configured by the MCS table above, and the other CW is given by a differential MCS index with respect to the one CW, by which the total MCS signaling overhead may be reduced.

Table 12 illustrates a differential MCS table having a bit width of 3 bits. The example of the proposal 13 may include Table 12, and if one CW (CW1) uses a 5-bit MCS table as in the LTE, and the other CW (CW2) uses a 3-bit differential table as shown in Table 12, 2 bits may be saved as 5+3=8 bits.

TABLE 12

| differential MCS index | Offset level |
|---|---|
| 0 | 0 |
| 1 | 1 |
| 2 | 2 |
| 3 | ≥3 |
| 4 | ≤−4 |
| 5 | −3 |
| 6 | −2 |
| 7 | −1 |

Table 12 is an example of 3-bit table, and parameters for configuring a differential MCS table such as a bit width and a step size of an offset level that comprise the table may be configured for a UE by an eNB.

If the MCS gap between CWs is very large depending on a channel environment (for example, in the case of NC-JT), the proposal may not be preferable. Therefore, which MCS table to be used by CW1 and CW2 may be agreed on in advance between an eNB and a UE or may be signaled to the UE through RRC or MAC CE.

As one example, whether to use the proposed MCS table (a table comprising modulation orders and TBS indexes may be configured independently for each CW) for each CW (CW1 or CW2) or whether to use the differential MCS table with respect to the MCS of CW1 as the MCS table of CW2 by giving dependency to the CW1 may be signaled to the UE.

Proposal 14—MCS Index Indication Method of Dual DCI

If dual DCI is applied, the MCS table indication method may be defined/configured as follows.

The MCS field of the first DCI may indicate which MCS table (for example, the MCS table proposed in the proposal 10, 11, 12 and/or 13) is to be used. And/or if a master MCS table such as one described in proposal 11 is used, the MCS field of the first DCI may be used for configuring/indicating the whole or part of the MCS table parameters. Then the MCS of the second DCI may be used for indicating a specific MCS index in the MCS table indicated by the first DCI.

Proposal 15—Method for Configuring MCS Table and CQI Table

An eNB may calculate MCS based on the CQI reported to the eNB and indicate the calculated MCS to a UE. However, for a more sophisticated and efficient MCS indication, a correlation between the MCS table and the CQI table may be considered. In other words, if the proposed CQI and MCS tables are used, for example, a UE configured with a low range CQI table may also be configured with a low range MCS table. To this purpose, if a master CQI table and an MCS table are used, at least step size and/or the maximum modulation order may be configured to be used in the same SNR range.

The combination of modulation orders used in the CQI and MCS tables described above may be given as follows if DL and UL transmission are included.

{QPSK/16QAM}
{QPSK/16QAM/64QAM}
{QPSK/16QAM/64QAM/256QAM}
{QPSK/16QAM/64QAM/256QAM/1024QAM}
{BPSK/QPSK/16QAM}
{BPSK/QPSK/16QAM/64QAM}
{BPSK/QPSK/16QAM/64QAM/256QAM}
{BPSK/QPSK/16QAM/64QAM/256QAM/1024QAM}

In this case, the modulation order of the master MCS and/or CQI table is {BPSK/QPSK/16QAM/64QAM/

256QAM/1024QAM}, and if the maximum modulation order supported within UE capability is given by Q', the modulation order of the UE may be configured as Qm according to Eq. 15 below.

$$Qm = \max\{\min\{Qmax, Q'\}, Qmin\} \quad [\text{Eq. 15}]$$

Here, Qmax and Qmin are parameters for configuring the master CQI/MCS table, each of which corresponds to an upper and lower modulation orders to be used within the master table. Q' represents an index to be reported in the case of CQI and an indicated index in the case of MCS.

If Eq. 15 is used or if a modulation order outside the range of Qmax and Qmin is reported or indicated, the corresponding modulation order may be applied after being changed to Qmax or Qmin.

In what follows, descriptions related to determination of TBS in NR will be provided.

TBS may be determined by using a specific equation. At this time, the specific equation may have the following parameters:

The number of layers to which codewords are mapped

Time/frequency resources on which PDSCH/PUSCH is scheduled

Option 1: the total number of REs available for PDSCH/PUSCH

Option 2: a reference number of a slot per PRB/RE per mini-slot and the number of PRB(s) for carrying PDSCH/PUSCH Modulation order Coding rate Whether a system is able to operate without a guarantee of providing information by which retransmission may be decoded without information about initial transmission should be considered:

A guarantee that the same TBS may be used between the initial transmission and the retransmission by using the same/different number of PRBs or the same/different number of symbols.

In addition to the above, TBS determination about code block division and specific packet size (for example, Voice over Internet Protocol (VoIP)), TBS determination about a specific service (for example, URLLC), and a decoupling possibility of a coding rate and a modulation order have to be considered. At this time, byte alignment is needed, and to determine the TBS value, a specific table may be needed in addition to the equation.

In the LTE, a system operates so that a reserved state is defined in the MCS table, and while the TBS index is kept to the initial transmission for more reliable transmission at the time of retransmission, the modulation order is allowed to be changed. However, considering the descriptions given above, in NR, retransmission may not be dependent on the initial transmission. In this case, the reserved state may not be needed on the MCS table, and an accurate modulation order, code rate and/or TBS has to be indicated for each transmission. To this purpose, the present specification proposes the following embodiment.

Proposal 16—MCS may be defined/expressed by two independent tables, namely tables about modulation order (X-bit) and code rate (Y-bit). Here, X and Y values may be configurable.

TABLE 13

| Modulation scheme index | Modulation order (Q) | Modulation order (Q') |
|---|---|---|
| 0 | 2 | 1 |
| 1 | 4 | 2 |
| 2 | 6 | 4 |
| 3 | 8 | 6 |

In Table 13, Q and Q' may refer to the modulation orders corresponding to CP-OFDM and DFT-s-OFDM, respectively. In other words, according to a waveform, interpretation of Table 13 may be performed differently. Or Table 14, which is independent of a waveform, may be defined.

TABLE 14

| Modulation scheme index | Modulation order (Q) |
|---|---|
| 0 | 1 |
| 1 | 2 |
| 2 | 4 |
| 3 | 6 |
| 4 | 8 |
| 5 | reserved |
| 6 | |
| 7 | |

In Table 14, 1024 QAM may be allocated afterwards as the reserved state.

TABLE 15

| Code rate index | code rate × 1024 (C) | code rate × 1024 (C') |
|---|---|---|
| 0 | 40 | 40 |
| 1 | 78 | 100 |
| 2 | 120 | 120 |
| 3 | 193 | 193 |
| 4 | 308 | 210 |
| 5 | 378 | 308 |
| 6 | 449 | 370 |
| 7 | 466 | 430 |
| 8 | 490 | 501 |
| 9 | 567 | 567 |
| 10 | 602 | 599 |
| 11 | 616 | 630 |
| 12 | 666 | 646 |
| 13 | 711 | 685 |
| 14 | 772 | 708 |
| 15 | 797 | 727 |
| 16 | 873 | 758 |
| 17 | 885 | 895 |
| 18 | 948 | Reserved |
| 19 | Reserved | |
| 20 | | |
| 21 | | |
| 22 | | |
| 23 | | |
| 24 | | |
| 25 | | |
| 26 | | |
| 27 | | |
| 28 | | |
| 29 | | |
| 30 | | |
| 31 | | |

In the Table 15 for code rate, C and C' may represent code rates corresponding to CP-OFDM and DFT-s-OFDM, respectively. In other words, depending on a waveform, interpretation of Table 15 may be performed differently. Or the table for code rate may be defined/configured independently of the waveform in a collective manner as shown in FIG. 16.

TABLE 16

| Code rate index | code rate × 1024 (C) |
|---|---|
| 0 | 40 |
| 1 | 78 |
| 2 | 100 |
| 3 | 120 |
| 4 | 193 |
| 5 | 210 |
| 6 | 308 |
| 7 | 370 |
| 8 | 378 |
| 9 | 430 |
| 10 | 449 |
| 11 | 466 |
| 12 | 490 |
| 13 | 501 |
| 14 | 567 |
| 15 | 599 |
| 16 | 602 |
| 17 | 616 |
| 18 | 630 |
| 19 | 646 |
| 20 | 666 |
| 21 | 685 |
| 22 | 708 |
| 23 | 711 |
| 24 | 727 |
| 25 | 758 |
| 26 | 772 |
| 27 | 797 |
| 28 | 873 |
| 29 | 885 |
| 30 | 895 |
| 31 | 948 |

The basic principle for configuring elements of the table is to configure a code rate corresponding to SNR to be fitted to a predetermined spacing of SNR. Along with this configuration, the table has to include a code rate corresponding to SNR for each modulation in an interval where modulation orders are overlapped. In other words, as shown in the example of Table 8, at the point where 16 QAM and 64 QAM are overlapped, the respective code rates are 616 and 466, and code rates for a case where modulation is overlapped as in the example have to be included in the table. Moreover, code rates for supporting a case where transmission is performed by lowering the code rate for reliable transmission at the time of retransmission (for example, a case where transmission has to be performed at 1/2 or 2/3 rate of the initial transmission) may also have to be included in Table 15 or 16, or a separate code rate scaling table may be defined and indicated individually to a UE by using DCI.

In the proposal above, Table 15 may be configured independently for each waveform, and the number and values of elements comprising a code rate may be different from each code rate. Also, similarly to how the proposed configurable MCS table is constructed, the code rate table may be constructed. In this case, information about a code rate range and spacing may be configured or predefined. This principle may be applied in the same manner for construction of Table 16.

In the LTE DL MCS table, a reserved state may be used not only to change the modulation order but also to maintain a TBS index the same as recent transmission. In the case of 1024 QAM (or 1024 QAM is supported), since 5 states have to be reserved, the remaining states may not be sufficient to support 1024 QAM. To solve this problem, two states representing a differential MCS order (for example, '+2' and '−2') may be considered.

If retransmission without a priori knowledge about initial transmission is supported, the reserved state may not be required in the MCS table. In this case, a table for a modulation order and a coding rate may be taken into account irrespective of whether a flexible indication of MCS is related to the initial transmission or retransmission.

In what follows, CSI report contents based on CSI feedback type I (including a multi-panel scenario) and type II codebook design will be described.

In NR-MIMO, two types of CSI for acquisition are supported: 1) type 1 having normal resolution and 2) type 2 having high resolution.

The primary use case of type I CSI is SU-MIMO, and type 2 CSI is intended to improve MU-MIMO performance by using high resolution PMI feedback. Therefore, type II codebook is capable of supporting up to rank 2 in the NR 1 step.

The type I CSI supports both of the single and multi-panel environments, and in the case of a single panel, two codebook configs are supported for rank 1 and 2. In the case of single panel, the maximum payload size of W1 is 10 bits for 32 ports with a 2D port layout, and the payload size of W2 is 4 bits when the codebook config 2 is configured. In the case of a multi-panel, the maximum payload of W1 is 14 bits when the number of supported panels is 4, and the maximum payload of W2 is 4 when mode 2 is configured. Therefore, analogous to the LTE class A, since PMI resolution of a periodic report based on PUCCH and a non-periodic report based on PUSCH is relatively low, type I CSI may be supported in NR. Therefore, the present specification proposes that NR supports both of the PUCCH-based and PUSCH-based CSI reporting in the case of type I CSI.

In the LTE class A, PUCCH-based reporting requires three reporting instances. For example, PUCCH mode 1-1 sub-mode 1 may be expressed as follows:

The first instance: RI
The second instance: W1
The third instance: W2 and CQI

The reason for allowing three reporting instances is that although performance degradation is expected due to error propagation among the three reporting instances, they are suitable for 11-bit payload size of PUCCH type 2. To minimize the CSI dependency problem, a flexible configuration may be considered for the PUCCH payload size. The configuration may allow single instance CSI reporting that may contain RI, W1, W2 and/or CQI. In the single instance CSI reporting, the maximum payload size may be determined by the maximum number of bits required for each CSI constituting element. Then, the required payload size of SB CSI may become N_SB*(4+SB CQI bit). Here, N_SB is the number of SBs, and 4 represents the maximum W2 payload size. If it is assumed that NSB=10 and 4-bit CQI (2-bit differential SB CQI for each CW) is used, a total of 80 bits are required for SB CSI reporting, which may not be desirable for PUCCH reporting based on single instance CSI reporting. And/or, LTE PUCCH mode 2-1 comprising RI, PTI, W1, W2, CQI and/or L-bit label may be considered. However, if an L-bit label is introduced to indicate a specific SB, performance degradation due to CSI dependency still exists. Therefore, a careful study for SB CSI reporting in PUCCH is required, and at least WB CSI (for example, RI, WB W1, WB W2 and/or WB CQI) may be reported through PUCCH (based reporting).

As a result, in NR, to solve the CSI dependency problem, PUCCH-based reporting may be designed. Also, at least WB CSI (for example, RI, WB W1, WB W2 and/or WB CQI) may be reported through PUCCH.

The payload size required for type II CSI feedback is much larger than that for type I CSI. Moreover, the payload size may almost double as the rank is increased from 1 to 2. Therefore, PUCCH-based reporting is not suitable for type II CSI feedback. One solution to allow PUCCH-based reporting according to type II CSI is to restrict the sizes of all codebook parameters as small as possible. However, in this case, codebook subsampling may be additionally needed. Therefore, in the case of type II CSI feedback, it is preferable to use only the PUSCH-based CSI reporting.

A remaining issue with respect to type II CSI feedback is related to whether dependency of W2 size is zero or not according to a preferred amplitude coefficient. Since RPI depends on RI, it is not desirable to perform joint encoding of RI and RPI. Instead, three separate/individual encodings such as RI, W1, and W2+CQI may be considered. However, this approach may become difficult to be applied due to error propagation between W1 and W2. Therefore, it may be necessary to clearly demonstrate performance benefit by reducing the W2 payload size. In other words, in the case of type II CSI feedback, it is necessary to clearly show the performance benefit by reducing the W2 payload size.

In the LTE, when RI>2, a 4-bit CQI table is used according to the maximum MCS level and 3-bit differential CQI table. In NR, since higher modulation such as 1024 QAM may be used, it may be necessary to introduce a different CQI table. In this case, if the 4-bit CQI table is maintained, the modulation level is lowered, and therefore, CQI reporting may become relatively inaccurate. Instead, a configurable Q-bit CQI table may be considered to support the step size and different ranges of MCS level for more accurate CQI reporting in a flexible manner. In other words, a configurable Q-bit CQI table may be considered to support various ranges of MCS level, step size, and more accurate CQI reporting in a flexible manner.

In NR, a CSI-RS may be used not only for CQI acquisition but also for beam management. In this case, an efficient beam management may be performed by using multiple CSI-RS ports within multiple CSI-RS resources. More specifically, different Tx beams may be mapped throughout a plurality of ports and a plurality of CSI-RS resources. Therefore, to indicate the best transmission beam correctly, CRI and PMI related to the port number may be employed. In relation to PMI indication, a port selection codebook having the rank 1 restriction may be one option. Also, to indicate quality of the best Tx beam(s) selected, related RSRP may be reported not only for CRI and PMI but also for gNB. In this case, an RSRP table for beam management has to be newly introduced. In other words, to indicate the best Tx beam(s) for beam management, one or more CRI, PMI and/or RSRP indicator may be reported.

FIG. 17 is a flow diagram illustrating a CSI reporting method of a terminal according to one embodiment of the present disclosure. With respect to the present flow diagram, the embodiment and descriptions given above may be applied in the same manner or in a similar manner, and repeated descriptions thereof will be omitted.

First of all, a UE may receive CSI configuration information for the CSI reporting from an eNB S1710. At this time, if CSI include CQI, and a CQI table in which different CQI indexes are allocated to different MCS levels for a UE to perform CQI reporting, the CSI configuration information may include a (candidate) CQI index range that may be reported by the UE within the CQI table and/or CQI configuration information about spacing between (candidate) CQI indexes that may be reported by the UE within the (candidate) CQI index range. At this time, the CQI table may correspond to a legacy CQI table defined in a legacy system (for example, LTE and/or NR system) or a CQI (master) table defined differently/separately/independently/newly (in a new wireless communication system) from the legacy CQI table. The CQI table defined separately may correspond to a table defined to have relatively higher resolution than the legacy CQI table.

At this time, different MCS levels may be defined/ assigned to indicate different modulation methods and/or coding rates, and at this time, index intervals may be configured/indicated differently for each modulation method.

Also, CQI configuration information may include, as CQI index range information, the minimum CQI index and/or the maximum CQI index within a CQI index range. In this case, the (candidate) CQI indexes reportable by the UE may be determined by the minimum CQI index and CQI indexes separated by an index interval from the minimum CQI index up to the maximum CQI index within the (candidate) CQI index range. Or the (candidate) CQI indexes reportable by the UE may be determined by the maximum CQI index and CQI indexes separated by the index interval from the maximum CQI index down to the minimum CQI index within the (candidate) CQI index range.

Also, the CQI configuration information may be transmitted to the UE through RRC and/or MAC CE.

Next, the UE may report the CSI generated based on the CSI configuration information to the eNB S1720. In other words, the UE may report, to the eNB, at least one CQI index selected based on a CSI-RS measurement result received from the eNB among the (candidate) CQI indexes indicated by the received CSI configuration information (in particular, CQI configuration information) as the CSI.

The bit size (Q) of a CQI table comprising CQI indexes reportable by the UE may be determined by Eq. 1.

$$Q = \text{ceiling}[\log\_2((CQI\_max - CQI\_min)/CQI\_stepsize) + 1]. \quad [\text{Eq. 1}]$$

Here, the CQI_max may represent the maximum CQI index, the CQI_min may represent the minimum CQI index, and the stepsize may represent the index interval. Therefore, the bit size (Q) of the CQI table comprising CQI indexes reportable by the UE may be configured independently (for example, differently) for each UE.

Meanwhile, if the CSI report corresponds to a PUCCH-based CSI report, the total bit size and/or format of the CSI may be determined based on the number of ports configured for the UE, panel type (single panel or multi-panel) and/or RI (or rank number) to be reported by the UE as the CSI.

Device in General to which the Present Disclosure May be Applied

FIG. 18 illustrates a block diagram of a wireless communication device according to one embodiment of the present disclosure.

Referring to FIG. 18, a wireless communication system comprises an eNB 1810 and a plurality of UEs 1810 located within the range of the eNB 1810.

The eNB 1810 comprises a processor 1811, a memory 1812, and a Radio Frequency (RF) unit 1813. The processor 1811 implements the proposed functions, processes and/or methods. Layers of a wireless interface protocol may be implemented by the processor 1811. The memory 1812, being connected to the processor 1811, stores various kinds of information to operate the processor 1811. The RF unit 1813, being connected to the processor 1811, transmits and/or receives a radio signal.

The UE 1820 comprises a processor 1821, a memory 1822, and an RF unit 1823. The processor 1821 implements the proposed functions, processes and/or methods. Layers of a wireless interface protocol may be implemented by the processor 1821. The memory 1822, being connected to the processor 1821, stores various kinds of information to operate the processor 1821. The RF unit 1823, being connected to the processor 1821, transmits and/or receives a radio signal.

The memory 1812, 1822 may be installed inside or outside the processor 1811, 1821 and may be connected to the processor 1811, 1821 via various well-known means. Also, the eNB 1810 and/or the UE 1820 may be equipped with a single antenna or multiple antennas.

FIG. 19 illustrates one example of an RF module of a wireless communication device to which a method proposed in the present specification may be applied.

More specifically, FIG. 19 illustrates one example of an RF module that may be implemented in a Frequency Division Duplex (FDD) system.

First, along a transmission path, the aforementioned processor processes data to be transmitted and provides an analog output signal to a transmitter 1910.

Inside the transmitter 1910, the analog output signal is filtered by a Low Pass Filter (LPF) 1911 to remove images caused by a digital-to-analog converter (ADC), converted from a baseband up to an RF band by a mixer 1912, and amplified by a variable gain amplifier (VGA) 1913; the amplified signal is filtered by a filter 1914, further amplified by a power amplifier (PA) 1915, routed via a duplexer(s) 1950/antenna switch(es) 1960, and transmitted through an antenna 1970.

Also, along a reception path, the antenna 1970 receives signals from the outside and provides received signals, where these signals are routed through the antenna switch(es)/duplexer(s) 1950 and are provided to a receiver 1920.

Inside the receiver 1920, received signals are amplified by a Low Noise Amplifier (LNA) 1923, filtered by a bandpass filter 1924, and converted from the RF band down to the baseband by a mixer 1925.

The down-converted signal is filtered by a low pass filter (LPF) 1926 and amplified by a VGA 1927 to obtain an analog input signal; the analog input signal is then provided to the aforementioned processor.

Also, a local oscillator (LO) generator 1940 generates transmission and reception LO signals and provides the generated signals to the up-converter 1912 and the down-converter 1925, respectively.

Also, a phase locked loop (PLL) 1930 receives control signal from the processor to generate transmission and reception LO signals at appropriate frequencies and provides control signals to an LO generator 1940.

Also, circuits shown in FIG. 19 may be arranged differently from the layout shown in FIG. 19.

FIG. 20 illustrates another example of an RF module of a wireless communication device to which a method proposed in the present specification may be applied.

More specifically, FIG. 20 illustrates one example of an RF module that may be implemented in a Time Division Duplex (TDD) system.

The transmitter 2010 and the receiver 2020 of the RF module in the TDD system have the same structure as the transmitter and the receiver of the RF module in the FDD system.

In what follows, the RF module of the TDD system will be described only for the part of structure different from that of the RF module of the FDD system, and for the same part of structure, descriptions of FIG. 19 will be referred to.

A signal amplified by a power amplifier (PA) 2015 of a transmitter is routed via a band select switch 2050, bandpass filter 2060, and antenna switch(es) 2070; and is transmitted through an antenna 2080.

Also, along a reception path, the antenna 2080 receives signal from the outside and provides received signals, where these signals are routed through the antenna switch(es) 2070, bandpass filter 2060, and band select switch 2050; and are provided to a receiver 2020.

The embodiments described above are combinations of constituting elements and features of the present disclosure in a predetermined form. Each individual element or feature has to be considered as optional except where otherwise explicitly indicated. Each individual element or feature may be implemented solely without being combined with other elements or features. Also, it is also possible to construct the embodiments of the present disclosure by combining a portion of the elements and/or features. A portion of a structure or feature of an embodiment may be included in another embodiment or may be replaced with the corresponding structure of feature of another embodiment. It should be clearly understood that the claims which are not explicitly cited within the technical scope of the present disclosure may be combined to form an embodiment or may be included in a new claim by an amendment after application.

In the present specification, 'A and/or B' may be interpreted to indicate at least one of A and/or B.

The embodiments of the present disclosure may be implemented by various means such as hardware, firmware, software, or a combination thereof. In the case of hardware implementation, one embodiment of the present disclosure may be implemented by using one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, and micro-processors.

In the case of implementation by firmware or software, one embodiment of the present disclosure may be implemented in the form of modules, procedures, functions, and the like which perform the functions or operations described above. Software codes may be stored in the memory and activated by the processor. The memory may be located inside or outside of the processor and may exchange data with the processor by using various well-known means.

It is apparent for those skilled in the art that the present disclosure may be embodied in other specific forms without departing from the essential characteristics of the present disclosure. Therefore, the detailed descriptions above should be regarded as being illustrative rather than restrictive in every aspect. The technical scope of the present disclosure should be determined by a reasonable interpretation of the appended claims, and all of the modifications that fall within an equivalent scope of the present disclosure belong to the technical scope of the present disclosure.

Various embodiments of the present disclosure have been described in their best mode for implementing the present disclosure.

INDUSTRIAL APPLICABILITY

The present disclosure has been described with respect to examples applied for the 3GPP LTE/LTE-A/5G system; however, the present disclosure may be applied to various other types of wireless communication systems in addition to the 3GPP LTE/LTE-A/5G system.

The invention claimed is:

1. A channel state information (CSI) reporting method by a UE in a wireless communication system, the method comprising:
   receiving, from a base station, CSI configuration information for CSI reporting; and
   reporting, to the base station, CSI generated based on the CSI configuration information,
   wherein a Channel Quality Indicator (CQI) table comprises at least one CQI index on modulation of 1024 QAM,
   wherein the CSI configuration information comprises (i) a CQI index range reportable by the UE within the CQI table and (ii) information about an index interval between CQI indexes reportable by the UE within the CQI index range,
   wherein the CSI includes at least one CQI index selected among CQI indexes indicated by the CQI configuration information, and
   wherein a bit size (Q) for reporting CQI based on a specific CQI table comprising the CQI indexes indicated by the CQI configuration information is determined by Eq. 1, $$Q=\text{ceiling}[\log\_2((CQI\_max-CQI\_min)/CQI\_stepsize)+1]. \quad [\text{Eq. 1}]$$

where the CQI_max represents a maximum CQI index, the CQI_min represents a minimum CQI index, and the stepsize represents the index interval.

2. The method of claim 1, wherein the CQI configuration information further includes the minimum CQI index and/or the maximum CQI index within the CQI index range as the CQI index range information.

3. The method of claim 2, wherein the CQI indexes indicated by the CQI configuration information are determined by the minimum CQI index and CQI indexes separated by the index interval from the minimum CQI index up to the maximum CQI index within the CQI index range; or by the maximum CQI index and CQI indexes separated by the index interval from the maximum CQI index down to the minimum CQI index within the CQI index range.

4. The method of claim 3, wherein the bit size (Q) for reporting the CQI based on the specific CQI table comprising CQI indexes indicated by the CQI configuration information is configured independently for each UE.

5. The method of claim 1, wherein the different MCS levels indicate different modulation methods and/or coding rates.

6. The method of claim 5, wherein the index interval is configured differently for each of the modulation methods.

7. The method of claim 1, wherein the CQI configuration information is transmitted to the UE through Radio Resource Control (RRC) and/or Media Access Control (MAC) Control Element (CE).

8. The method of claim 1, wherein, if the CSI report corresponds to a Physical Uplink Control Channel (PUCCH)-based CSI report, the total bit size and/or format of the CSI is determined based on the number of ports configured for the UE, panel type and/or Rank Indicator (RI) to be reported by the UE as the CSI.

9. The method of claim 1, wherein the CQI table corresponds to (i) a legacy CQI table defined in a legacy system or a CQI table defined separately from the legacy CQI table.

10. The method of claim 9, wherein the separately defined CQI table is a table defined to have relatively higher resolution than the legacy CQI table.

11. A UE reporting Channel State Information (CSI) in a wireless communication system, the UE comprising:
    a Radio Frequency (RF) unit for transmitting and receiving a radio signal; and
    a processor for controlling the RF unit, wherein the processor is configured to:
    receive, from a base station, CSI configuration information for CSI reporting; and
    report, to the base station, CSI generated based on the CSI configuration information,
    wherein a Channel Quality Indicator (CQI) table comprises at least one CQI index on modulation of 1024 QAM,
    wherein the CSI configuration information comprises (i) a CQI index range reportable by the UE within the CQI table and (ii) information about an index interval between CQI indexes reportable by the UE within the CQI index range,
    wherein the CSI includes at least one CQI index selected among CQI indexes indicated by the CQI configuration information, and
    wherein a bit size (Q) for reporting CQI based on a specific CQI table comprising the CQI indexes indicated by the CQI configuration information is determined by Eq. 1, $$Q=\text{ceiling}[\log\_2((CQI\_max-CQI\_min)/CQI\_stepsize)+1]. \quad [\text{Eq. 1}]$$

where the CQI_max represents a maximum CQI index, the CQI_min represents a minimum CQI index, and the stepsize represents the index interval.

12. The UE of claim 11, wherein the CQI configuration information further includes the minimum CQI index and/or the maximum CQI index within the CQI index range as the CQI index range information.

* * * * *